US009819679B1

(12) United States Patent
Bertz et al.

(10) Patent No.: US 9,819,679 B1
(45) Date of Patent: Nov. 14, 2017

(54) HARDWARE ASSISTED PROVENANCE PROOF OF NAMED DATA NETWORKING ASSOCIATED TO DEVICE DATA, ADDRESSES, SERVICES, AND SERVERS

(71) Applicant: Sprint Communications Company L.P., Overland Park, KS (US)

(72) Inventors: Lyle T. Bertz, Lee's Summit, MO (US); Lyle W. Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 162 days.

(21) Appl. No.: 14/853,492

(22) Filed: Sep. 14, 2015

(51) Int. Cl.
*H04L 9/00* (2006.01)
*H04L 29/06* (2006.01)
*H04L 9/32* (2006.01)

(52) U.S. Cl.
CPC ........ *H04L 63/0876* (2013.01); *H04L 9/3247* (2013.01); *H04L 63/0435* (2013.01); *H04L 63/0823* (2013.01)

(58) Field of Classification Search
CPC ............... H04L 63/0876; H04L 9/3247; H04L 63/0435; H04L 63/0823
USPC ........................................................ 713/176
See application file for complete search history.

(56) References Cited

U.S. PATENT DOCUMENTS

| | | | |
|---|---|---|---|
| 5,303,378 A | 4/1994 | Cohen | |
| 5,321,735 A | 6/1994 | Breeden et al. | |
| 5,764,889 A | 6/1998 | Ault et al. | |
| 5,796,952 A | 8/1998 | Davis et al. | |
| 5,825,876 A | 10/1998 | Peterson, Jr. | |
| 6,131,024 A | 10/2000 | Boltz | |
| 6,177,860 B1 | 1/2001 | Cromer et al. | |
| 6,219,712 B1 | 4/2001 | Mann et al. | |
| 6,222,463 B1 | 4/2001 | Rai | |

(Continued)

FOREIGN PATENT DOCUMENTS

| | | |
|---|---|---|
| EP | 1933252 A1 | 6/2008 |
| WO | WO2011025433 A1 | 3/2011 |

(Continued)

OTHER PUBLICATIONS

FAIPP Pre-Interview Communication dated Nov. 12, 2014, U.S. Appl. No. 13/844,145, filed Mar. 15, 2013.

(Continued)

*Primary Examiner* — Baotran N To

(57) ABSTRACT

A system of delivering data content with hardware assisted provenance proof in named data networking (NDN). The system comprises a data content server with a trusted security zone enabled that is configured to receive the first request message from the first client, and transmit the desired data content based on the name comprised in the first request message and a determination that the first client is trusted and that the routing path from the first client to the data content server is trusted. The system further comprises a signature server with a trusted security zone enabled that is configured to receive the first request message from the first client, generate a digital signature based on the desired data content, and transmit the corresponding digital signature based on a determination that the first client is trusted and that the routing path from the first client to the signature server is trusted.

20 Claims, 8 Drawing Sheets

(56) References Cited

U.S. PATENT DOCUMENTS

| | | |
|---|---|---|
| 6,363,150 B1 | 3/2002 | Bhagavath et al. |
| 6,389,403 B1 | 5/2002 | Dorak, Jr. |
| 6,434,561 B1 | 8/2002 | Durst, Jr. et al. |
| 6,477,180 B1 | 11/2002 | Aggarwal et al. |
| 6,507,869 B1 | 1/2003 | Franke et al. |
| 6,507,904 B1 | 1/2003 | Ellison et al. |
| 6,614,893 B1 | 9/2003 | Paiz |
| 6,651,171 B1 | 11/2003 | England et al. |
| 6,668,322 B1 | 12/2003 | Wood et al. |
| 6,691,230 B1 | 2/2004 | Bardon |
| 6,754,784 B1 | 6/2004 | North et al. |
| 6,823,454 B1 | 11/2004 | Hind et al. |
| 6,824,064 B2 | 11/2004 | Guthery et al. |
| 6,895,234 B1 | 5/2005 | Laursen et al. |
| 7,043,241 B1 | 5/2006 | Sladek et al. |
| 7,069,234 B1 | 6/2006 | Cornelius et al. |
| 7,127,541 B2 | 10/2006 | Govindarajulu et al. |
| 7,366,806 B2 | 4/2008 | Milenkovic et al. |
| 7,386,275 B2 | 6/2008 | Pirzada et al. |
| 7,387,240 B2 | 6/2008 | Ziegler |
| 7,519,824 B1 | 4/2009 | Peyravian et al. |
| 7,552,467 B2 | 6/2009 | Lindsay |
| 7,571,364 B2 | 8/2009 | Whetsel |
| 7,574,382 B1 | 8/2009 | Hubert |
| 7,650,645 B1 | 1/2010 | Langendorf et al. |
| 7,716,720 B1 | 5/2010 | Marek et al. |
| 7,761,558 B1 | 7/2010 | Jindal et al. |
| 7,849,309 B1 | 12/2010 | Brown |
| 7,873,837 B1 | 1/2011 | Lee et al. |
| 7,895,642 B1 | 2/2011 | Larson et al. |
| 7,921,303 B2 | 4/2011 | Mauro, II |
| 8,060,449 B1 | 11/2011 | Zhu |
| 8,073,428 B2 | 12/2011 | Khetawat et al. |
| 8,086,238 B1 | 12/2011 | Kosar |
| 8,112,794 B2 | 2/2012 | Little et al. |
| 8,190,919 B2 | 5/2012 | Natarajan et al. |
| 8,204,480 B1 | 6/2012 | Lindteigen et al. |
| 8,238,823 B2 | 8/2012 | Maugars et al. |
| 8,271,336 B2 | 9/2012 | Mikurak |
| 8,295,811 B1 | 10/2012 | Gailloux et al. |
| 8,298,295 B2 | 10/2012 | Aissi et al. |
| 8,316,237 B1 | 11/2012 | Felsher et al. |
| 8,332,953 B2 | 12/2012 | Lemieux et al. |
| 8,402,543 B1 | 3/2013 | Ranjan et al. |
| 8,413,229 B2 | 4/2013 | Mullick et al. |
| 8,429,409 B1 | 4/2013 | Wall et al. |
| 8,442,588 B2 | 5/2013 | Sims et al. |
| 8,443,420 B2 | 5/2013 | Brown et al. |
| 8,447,983 B1 | 5/2013 | Beck et al. |
| 8,494,576 B1 | 7/2013 | Bye et al. |
| 8,498,572 B1 | 7/2013 | Schooley et al. |
| 8,504,097 B1 | 8/2013 | Cope et al. |
| 8,542,833 B2 | 9/2013 | Devol et al. |
| 8,566,183 B1 | 10/2013 | Bonar et al. |
| 8,588,749 B1 | 11/2013 | Sadhvani et al. |
| 8,590,012 B2 | 11/2013 | Roy et al. |
| 8,631,247 B2 | 1/2014 | O'Loughlin et al. |
| 8,632,000 B2 | 1/2014 | Laracey |
| 8,649,770 B1 | 2/2014 | Cope et al. |
| 8,650,492 B1 | 2/2014 | Mui et al. |
| 8,661,119 B1 | 2/2014 | Jindal et al. |
| 8,667,607 B2 | 3/2014 | Paczkowski et al. |
| 8,681,969 B1 | 3/2014 | Rodde et al. |
| 8,707,056 B2 | 4/2014 | Felton |
| 8,712,407 B1 | 4/2014 | Cope et al. |
| 8,718,554 B2 | 5/2014 | Abel |
| 8,719,586 B1 | 5/2014 | Paleja et al. |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 8,787,873 B1 | 7/2014 | Hitt et al. |
| 8,793,808 B2 | 7/2014 | Boccon-Gibod |
| 8,797,875 B2 | 8/2014 | Garcia Martin et al. |
| 8,811,971 B2 | 8/2014 | Corda et al. |
| 8,826,015 B2 | 9/2014 | Lakshminarayanan et al. |
| 8,831,998 B1 | 9/2014 | Cramer et al. |
| 8,839,460 B2 | 9/2014 | Shirlen et al. |
| 8,850,568 B2 | 9/2014 | Shirlen et al. |
| 8,856,600 B2 | 10/2014 | Zadigian et al. |
| 8,862,181 B1 | 10/2014 | Cope et al. |
| 8,863,252 B1 | 10/2014 | Katzer et al. |
| 8,868,898 B1 | 10/2014 | Van Hoof |
| 8,881,977 B1 | 11/2014 | Paczkowski et al. |
| 8,886,925 B2 | 11/2014 | Qureshi et al. |
| 8,954,588 B1 | 2/2015 | Bertz et al. |
| 8,984,592 B1 | 3/2015 | Paczkowski et al. |
| 8,989,705 B1 | 3/2015 | Katzer et al. |
| 9,015,068 B1 | 4/2015 | Bertz et al. |
| 9,021,585 B1 | 4/2015 | Paczkowski et al. |
| 9,027,102 B2 | 5/2015 | Katzer et al. |
| 9,049,013 B2 | 6/2015 | Paczkowski et al. |
| 9,049,186 B1 | 6/2015 | Paczkowski et al. |
| 9,066,230 B1 | 6/2015 | Paczkowski et al. |
| 9,069,952 B1 | 6/2015 | Paczkowski et al. |
| 9,104,840 B1 | 8/2015 | Paczkowski et al. |
| 9,118,655 B1 | 8/2015 | Paczkowski et al. |
| 9,161,227 B1 | 10/2015 | Bye et al. |
| 9,161,325 B1 | 10/2015 | Urbanek |
| 9,171,243 B1 | 10/2015 | Cordes et al. |
| 9,177,157 B2 | 11/2015 | Binder |
| 9,183,412 B2 | 11/2015 | Bye et al. |
| 9,183,606 B1 | 11/2015 | Paczkowski et al. |
| 9,185,626 B1 | 11/2015 | Kunkel et al. |
| 9,191,388 B1 | 11/2015 | Paczkowski et al. |
| 9,191,522 B1 | 11/2015 | Krieger et al. |
| 9,208,339 B1 | 12/2015 | Paczkowski et al. |
| 9,210,576 B1 | 12/2015 | Cope et al. |
| 9,215,180 B1 | 12/2015 | Bertz et al. |
| 9,226,145 B1 | 12/2015 | Loman et al. |
| 9,230,085 B1 | 1/2016 | Paczkowski et al. |
| 9,253,589 B2 | 2/2016 | McCann et al. |
| 9,268,959 B2 | 2/2016 | Paczkowski et al. |
| 9,282,898 B2 | 3/2016 | McRoberts et al. |
| 9,324,016 B1 | 4/2016 | Cordes et al. |
| 9,374,363 B1 | 6/2016 | Paczkowski et al. |
| 9,384,498 B1 | 7/2016 | Bertz et al. |
| 9,443,088 B1 | 9/2016 | Bye et al. |
| 9,454,723 B1 | 9/2016 | Cordes et al. |
| 9,473,945 B1 | 10/2016 | Marquardt et al. |
| 9,560,519 B1 | 1/2017 | McCracken, Jr. et al. |
| 9,613,208 B1 | 4/2017 | Paczkowski et al. |
| 9,712,999 B1 | 7/2017 | Cordes et al. |
| 2001/0041591 A1 | 11/2001 | Carroll |
| 2002/0002468 A1 | 1/2002 | Spagna et al. |
| 2002/0007456 A1 | 1/2002 | Peinado et al. |
| 2002/0035697 A1 | 3/2002 | McCurdy et al. |
| 2002/0091569 A1 | 7/2002 | Kitaura et al. |
| 2002/0095389 A1 | 7/2002 | Gaines |
| 2002/0156911 A1 | 10/2002 | Croman et al. |
| 2002/0166070 A1 | 11/2002 | Mualem et al. |
| 2002/0174344 A1 | 11/2002 | Ting |
| 2002/0181503 A1 | 12/2002 | Montgomery |
| 2002/0184325 A1 | 12/2002 | Killcommons et al. |
| 2002/0194361 A1 | 12/2002 | Itoh et al. |
| 2002/0194496 A1 | 12/2002 | Griffin et al. |
| 2003/0045273 A1 | 3/2003 | Pyhalammi et al. |
| 2003/0092435 A1 | 5/2003 | Boivin |
| 2003/0093667 A1 | 5/2003 | Dutta et al. |
| 2003/0110046 A1 | 6/2003 | Cofta |
| 2003/0126225 A1 | 7/2003 | Camble et al. |
| 2003/0172163 A1 | 9/2003 | Fujita et al. |
| 2003/0182347 A1 | 9/2003 | Dehlinger |
| 2003/0216143 A1 | 11/2003 | Roese et al. |
| 2003/0229514 A2 | 12/2003 | Brown |
| 2003/0237002 A1 | 12/2003 | Oishi et al. |
| 2004/0036572 A1 | 2/2004 | Forster |
| 2004/0043788 A1 | 3/2004 | Mittal |
| 2004/0064351 A1 | 4/2004 | Mikurak |
| 2004/0093274 A1 | 5/2004 | Vanska et al. |
| 2004/0137890 A1 | 7/2004 | Kalke |
| 2004/0158840 A1 | 8/2004 | Rothman et al. |
| 2004/0202319 A1 | 10/2004 | Hussain et al. |

(56) References Cited

U.S. PATENT DOCUMENTS

| | | |
|---|---|---|
| 2004/0202328 A1 | 10/2004 | Hara |
| 2004/0233844 A1 | 11/2004 | Yu et al. |
| 2004/0234049 A1 | 11/2004 | Melideo |
| 2004/0243810 A1 | 12/2004 | Rindborg et al. |
| 2004/0264372 A1 | 12/2004 | Huang |
| 2005/0015601 A1 | 1/2005 | Tabi |
| 2005/0044375 A1 | 2/2005 | Paatero et al. |
| 2005/0045719 A1 | 3/2005 | Yang |
| 2005/0052994 A1 | 3/2005 | Lee |
| 2005/0091505 A1 | 4/2005 | Riley et al. |
| 2005/0107068 A1 | 5/2005 | Smith et al. |
| 2005/0123596 A1 | 6/2005 | Kohane et al. |
| 2005/0125396 A1 | 6/2005 | Liu |
| 2005/0138433 A1 | 6/2005 | Linetsky |
| 2005/0145688 A1 | 7/2005 | Milenkovic et al. |
| 2005/0153741 A1 | 7/2005 | Chen et al. |
| 2005/0164680 A1 | 7/2005 | Gould |
| 2005/0181796 A1 | 8/2005 | Kumar et al. |
| 2005/0200478 A1 | 9/2005 | Koch et al. |
| 2005/0226468 A1 | 10/2005 | Deshpande et al. |
| 2005/0228892 A1 | 10/2005 | Riley et al. |
| 2005/0235166 A1 | 10/2005 | England et al. |
| 2005/0239481 A1 | 10/2005 | Seligmann |
| 2005/0258250 A1 | 11/2005 | Melick et al. |
| 2005/0272445 A1 | 12/2005 | Zellner |
| 2005/0280557 A1 | 12/2005 | Jha et al. |
| 2005/0283660 A1 | 12/2005 | McKeen et al. |
| 2005/0289355 A1 | 12/2005 | Kitariev et al. |
| 2006/0008256 A1 | 1/2006 | Khedouri et al. |
| 2006/0030291 A1 | 2/2006 | Dawson et al. |
| 2006/0036851 A1 | 2/2006 | DeTreville |
| 2006/0040641 A1 | 2/2006 | Dawson et al. |
| 2006/0053283 A1 | 3/2006 | Feinleib et al. |
| 2006/0074544 A1 | 4/2006 | Morariu et al. |
| 2006/0129488 A1 | 6/2006 | Vincent |
| 2006/0156026 A1 | 7/2006 | Utin |
| 2006/0161626 A1 | 7/2006 | Cardina et al. |
| 2006/0164978 A1 | 7/2006 | Werner et al. |
| 2006/0168637 A1 | 7/2006 | Vysotsky et al. |
| 2006/0171537 A1 | 8/2006 | Enright |
| 2006/0190605 A1 | 8/2006 | Franz et al. |
| 2006/0212853 A1 | 9/2006 | Sutardja |
| 2006/0218320 A1 | 9/2006 | Avraham et al. |
| 2006/0224901 A1 | 10/2006 | Lowe |
| 2006/0239131 A1 | 10/2006 | Nathan et al. |
| 2006/0245438 A1 | 11/2006 | Sajassi et al. |
| 2006/0258289 A1 | 11/2006 | Dua |
| 2006/0259790 A1 | 11/2006 | Asokan et al. |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0006175 A1 | 1/2007 | Durham et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0061570 A1 | 3/2007 | Holtzman et al. |
| 2007/0078988 A1 | 4/2007 | Miloushev et al. |
| 2007/0079120 A1 | 4/2007 | Bade et al. |
| 2007/0094273 A1 | 4/2007 | Fritsch et al. |
| 2007/0094691 A1 | 4/2007 | Gazdzinski |
| 2007/0104215 A1 | 5/2007 | Wang et al. |
| 2007/0118880 A1 | 5/2007 | Mauro |
| 2007/0143210 A1 | 6/2007 | Yeung et al. |
| 2007/0150730 A1 | 6/2007 | Conti |
| 2007/0156850 A1 | 7/2007 | Carrion |
| 2007/0162759 A1 | 7/2007 | Buskey et al. |
| 2007/0167167 A1 | 7/2007 | Jiang |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0188306 A1 | 8/2007 | Tethrake et al. |
| 2007/0192652 A1 | 8/2007 | Kao et al. |
| 2007/0197261 A1 | 8/2007 | Humbel |
| 2007/0214332 A1 | 9/2007 | Sonoda et al. |
| 2007/0226389 A1 | 9/2007 | Poortman |
| 2007/0276969 A1 | 11/2007 | Bressy et al. |
| 2007/0277223 A1 | 11/2007 | Datta et al. |
| 2007/0280245 A1 | 12/2007 | Rosberg |
| 2007/0283449 A1 | 12/2007 | Blum et al. |
| 2008/0005794 A1 | 1/2008 | Inoue et al. |
| 2008/0011825 A1 | 1/2008 | Giordano et al. |
| 2008/0014867 A1 | 1/2008 | Finn |
| 2008/0020745 A1 | 1/2008 | Bae et al. |
| 2008/0022374 A1 | 1/2008 | Brown et al. |
| 2008/0022389 A1 | 1/2008 | Calcev et al. |
| 2008/0034231 A1 | 2/2008 | Ginter et al. |
| 2008/0051142 A1 | 2/2008 | Calvet et al. |
| 2008/0068166 A1 | 3/2008 | Lauper et al. |
| 2008/0089517 A1 | 4/2008 | Bianco et al. |
| 2008/0092213 A1 | 4/2008 | Wei et al. |
| 2008/0097793 A1 | 4/2008 | Dicks et al. |
| 2008/0100419 A1 | 5/2008 | Jatschka et al. |
| 2008/0108321 A1 | 5/2008 | Taaghol et al. |
| 2008/0109662 A1 | 5/2008 | Natarajan et al. |
| 2008/0121687 A1 | 5/2008 | Buhot |
| 2008/0146280 A1 | 6/2008 | Sasse et al. |
| 2008/0155271 A1 | 6/2008 | Barck et al. |
| 2008/0159129 A1 | 7/2008 | Songhurst et al. |
| 2008/0159131 A1 | 7/2008 | Hoeflin et al. |
| 2008/0162361 A1 | 7/2008 | Sklovsky et al. |
| 2008/0168515 A1 | 7/2008 | Benson et al. |
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0201578 A1 | 8/2008 | Drake |
| 2008/0208681 A1 | 8/2008 | Hammad et al. |
| 2008/0212503 A1 | 9/2008 | Lipford et al. |
| 2008/0232259 A1 | 9/2008 | Thomson |
| 2008/0244758 A1 | 10/2008 | Sahita et al. |
| 2008/0271163 A1 | 10/2008 | Stillerman et al. |
| 2008/0281953 A1 | 11/2008 | Blaisdell |
| 2008/0304640 A1 | 12/2008 | Reilly |
| 2009/0047923 A1 | 2/2009 | Jain et al. |
| 2009/0049220 A1 | 2/2009 | Conti et al. |
| 2009/0055278 A1 | 2/2009 | Nemani |
| 2009/0070272 A1 | 3/2009 | Jain |
| 2009/0075592 A1 | 3/2009 | Nystrom et al. |
| 2009/0089449 A1 | 4/2009 | Day |
| 2009/0113425 A1 | 4/2009 | Ports et al. |
| 2009/0118839 A1 | 5/2009 | Accapadi et al. |
| 2009/0132381 A1 | 5/2009 | Gangi |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0164800 A1 | 6/2009 | Johansson et al. |
| 2009/0182605 A1 | 7/2009 | Lappas et al. |
| 2009/0182634 A1 | 7/2009 | Park et al. |
| 2009/0192915 A1 | 7/2009 | Fernandez |
| 2009/0193491 A1 | 7/2009 | Rao |
| 2009/0204959 A1 | 8/2009 | Anand et al. |
| 2009/0215385 A1 | 8/2009 | Waters et al. |
| 2009/0224919 A1 | 9/2009 | Angell et al. |
| 2009/0227290 A1 | 9/2009 | Chien |
| 2009/0248445 A1 | 10/2009 | Harnick |
| 2009/0271321 A1 | 10/2009 | Stafford |
| 2009/0275364 A1 | 11/2009 | Morel et al. |
| 2009/0281947 A1 | 11/2009 | Erel |
| 2009/0289764 A1 | 11/2009 | Chiu |
| 2009/0300599 A1 | 12/2009 | Piotrowski |
| 2009/0312011 A1 | 12/2009 | Huomo et al. |
| 2009/0320028 A1 | 12/2009 | Gellerich et al. |
| 2009/0320048 A1 | 12/2009 | Watt et al. |
| 2010/0031325 A1 | 2/2010 | Maigne et al. |
| 2010/0052844 A1 | 3/2010 | Wesby |
| 2010/0064341 A1 | 3/2010 | Aldera |
| 2010/0066486 A1 | 3/2010 | Park et al. |
| 2010/0075669 A1 | 3/2010 | Sparks et al. |
| 2010/0077487 A1 | 3/2010 | Travis et al. |
| 2010/0082977 A1 | 4/2010 | Boyle et al. |
| 2010/0121156 A1 | 5/2010 | Yoo |
| 2010/0125512 A1 | 5/2010 | Jones et al. |
| 2010/0125904 A1 | 5/2010 | Nice et al. |
| 2010/0127868 A1 | 5/2010 | Hamilton et al. |
| 2010/0128598 A1 | 5/2010 | Gandhewar et al. |

(56) References Cited

U.S. PATENT DOCUMENTS

| | | |
|---|---|---|
| 2010/0130170 A1 | 5/2010 | Liu et al. |
| 2010/0142517 A1 | 6/2010 | Montemurro et al. |
| 2010/0146589 A1 | 6/2010 | Safa |
| 2010/0153513 A1 | 6/2010 | Zahran |
| 2010/0153721 A1 | 6/2010 | Mellqvist |
| 2010/0162028 A1 | 6/2010 | Frank et al. |
| 2010/0190469 A1 | 7/2010 | Vanderveen et al. |
| 2010/0198943 A1 | 8/2010 | Harrang et al. |
| 2010/0217709 A1 | 8/2010 | Aabye et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0263029 A1 | 10/2010 | Tohmo et al. |
| 2010/0269156 A1 | 10/2010 | Hohlfeld et al. |
| 2010/0274726 A1 | 10/2010 | Florek et al. |
| 2010/0279653 A1 | 11/2010 | Poltorak |
| 2010/0281139 A1 | 11/2010 | Deprun |
| 2010/0291896 A1 | 11/2010 | Corda |
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1 | 12/2010 | Rogel |
| 2011/0010720 A1 | 1/2011 | Smith et al. |
| 2011/0014948 A1 | 1/2011 | Yeh |
| 2011/0021175 A1 | 1/2011 | Florek et al. |
| 2011/0030030 A1 | 2/2011 | Terpening et al. |
| 2011/0035604 A1 | 2/2011 | Habraken |
| 2011/0050713 A1 | 3/2011 | McCrary et al. |
| 2011/0055084 A1 | 3/2011 | Singh |
| 2011/0063093 A1 | 3/2011 | Fung et al. |
| 2011/0072492 A1 | 3/2011 | Mohler et al. |
| 2011/0078081 A1 | 3/2011 | Pirzadeh et al. |
| 2011/0078760 A1 | 3/2011 | De Perthuis |
| 2011/0082711 A1 | 4/2011 | Poeze et al. |
| 2011/0107426 A1 | 5/2011 | Yen et al. |
| 2011/0112968 A1 | 5/2011 | Florek et al. |
| 2011/0113479 A1 | 5/2011 | Ganem |
| 2011/0130635 A1 | 6/2011 | Ross |
| 2011/0138064 A1 | 6/2011 | Rieger et al. |
| 2011/0145923 A1 | 6/2011 | Largman et al. |
| 2011/0145926 A1 | 6/2011 | Dalcher et al. |
| 2011/0151836 A1 | 6/2011 | Dadu et al. |
| 2011/0154032 A1 | 6/2011 | Mauro |
| 2011/0166883 A1 | 7/2011 | Palmer et al. |
| 2011/0173090 A1 | 7/2011 | Miller et al. |
| 2011/0202916 A1 | 8/2011 | VoBa et al. |
| 2011/0208797 A1 | 8/2011 | Kim |
| 2011/0212707 A1 | 9/2011 | Mahalal |
| 2011/0216701 A1 | 9/2011 | Patel et al. |
| 2011/0218849 A1 | 9/2011 | Rutigliano et al. |
| 2011/0226853 A1 | 9/2011 | Soh et al. |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0254687 A1 | 10/2011 | Arponen et al. |
| 2011/0258443 A1 | 10/2011 | Barry |
| 2011/0258462 A1 | 10/2011 | Robertson et al. |
| 2011/0269456 A1 | 11/2011 | Krishnaswamy et al. |
| 2011/0276677 A1 | 11/2011 | Osuga et al. |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1 | 1/2012 | Sallam |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0040662 A1 | 2/2012 | Rahman et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0079100 A1 | 3/2012 | McIntyre et al. |
| 2012/0083242 A1 | 4/2012 | Spitz et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0108295 A1 | 5/2012 | Schell et al. |
| 2012/0115433 A1 | 5/2012 | Young et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137101 A1 | 5/2012 | Arcese et al. |
| 2012/0137117 A1 | 5/2012 | Bosch et al. |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0149338 A1 | 6/2012 | Roundtree |
| 2012/0150601 A1 | 6/2012 | Fisher |
| 2012/0154413 A1 | 6/2012 | Kim et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0166806 A1* | 6/2012 | Zhang ............... H04L 9/3247 713/176 |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0191536 A1 | 7/2012 | Chen et al. |
| 2012/0196529 A1 | 8/2012 | Huomo et al. |
| 2012/0196586 A1 | 8/2012 | Grigg et al. |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0218084 A1 | 8/2012 | Arponen et al. |
| 2012/0220269 A1 | 8/2012 | Feng |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0259722 A1 | 10/2012 | Mikurak |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0274444 A1 | 11/2012 | Micali et al. |
| 2012/0282924 A1 | 11/2012 | Tagg et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0297202 A1 | 11/2012 | Gallet et al. |
| 2012/0303961 A1 | 11/2012 | Kean et al. |
| 2012/0304286 A1 | 11/2012 | Croll et al. |
| 2012/0309345 A1 | 12/2012 | Wake et al. |
| 2012/0324293 A1 | 12/2012 | Grube et al. |
| 2012/0329425 A1 | 12/2012 | Velusamy et al. |
| 2013/0003543 A1 | 1/2013 | Ludwig |
| 2013/0010641 A1 | 1/2013 | Dinan |
| 2013/0014259 A1 | 1/2013 | Gribble et al. |
| 2013/0019323 A1 | 1/2013 | Arvidsson et al. |
| 2013/0031374 A1 | 1/2013 | Thom et al. |
| 2013/0034081 A1 | 2/2013 | Ban et al. |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0062417 A1 | 3/2013 | Lee et al. |
| 2013/0067552 A1 | 3/2013 | Hawkes et al. |
| 2013/0074067 A1 | 3/2013 | Chowdhry |
| 2013/0086385 A1 | 4/2013 | Poeluev |
| 2013/0086684 A1 | 4/2013 | Mohler |
| 2013/0086695 A1 | 4/2013 | Lakshminarayanan |
| 2013/0097302 A9 | 4/2013 | Khedouri et al. |
| 2013/0097657 A1 | 4/2013 | Cardamore et al. |
| 2013/0105565 A1 | 5/2013 | Kamprath |

(56) References Cited

U.S. PATENT DOCUMENTS

| | | |
|---|---|---|
| 2013/0109307 A1 | 5/2013 | Reisgies et al. |
| 2013/0111095 A1 | 5/2013 | Mehrotra et al. |
| 2013/0117186 A1 | 5/2013 | Weinstein et al. |
| 2013/0124583 A1 | 5/2013 | Ferguson et al. |
| 2013/0125114 A1 | 5/2013 | Frascadore |
| 2013/0136126 A1 | 5/2013 | Wang et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159021 A1 | 6/2013 | Felsher |
| 2013/0159186 A1 | 6/2013 | Brudnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0175984 A1 | 7/2013 | Yamazaki et al. |
| 2013/0191632 A1 | 7/2013 | Spector et al. |
| 2013/0212704 A1 | 8/2013 | Shablygin et al. |
| 2013/0231098 A1 | 9/2013 | Jonas et al. |
| 2013/0260791 A1 | 10/2013 | Malinovskiy et al. |
| 2013/0262264 A1 | 10/2013 | Karstoft |
| 2013/0263212 A1 | 10/2013 | Faltyn et al. |
| 2013/0290359 A1 | 10/2013 | Eronen et al. |
| 2013/0290709 A1 | 10/2013 | Muppidi et al. |
| 2013/0310003 A1 | 11/2013 | Sadhvani et al. |
| 2013/0313314 A1 | 11/2013 | Jeng et al. |
| 2013/0331067 A1 | 12/2013 | Coussemaeker et al. |
| 2013/0332456 A1 | 12/2013 | Arkin |
| 2013/0343181 A1 | 12/2013 | Stroud et al. |
| 2013/0345530 A1* | 12/2013 | McRoberts .......... A61B 5/0022 600/323 |
| 2013/0347064 A1 | 12/2013 | Aissi |
| 2013/0347103 A1 | 12/2013 | Veteikis et al. |
| 2014/0007182 A1 | 1/2014 | Qureshi et al. |
| 2014/0007222 A1 | 1/2014 | Qureshi et al. |
| 2014/0052562 A1 | 2/2014 | Oliveira et al. |
| 2014/0059642 A1 | 2/2014 | Deasy et al. |
| 2014/0074508 A1 | 3/2014 | Ying et al. |
| 2014/0089243 A1 | 3/2014 | Oppenheimer |
| 2014/0089699 A1 | 3/2014 | O'Connor et al. |
| 2014/0104287 A1 | 4/2014 | Nalluri et al. |
| 2014/0106709 A1 | 4/2014 | Palamara et al. |
| 2014/0141718 A1 | 5/2014 | Stromberg et al. |
| 2014/0143826 A1 | 5/2014 | Sharp et al. |
| 2014/0155025 A1 | 6/2014 | Parker et al. |
| 2014/0166745 A1 | 6/2014 | Graef et al. |
| 2014/0173747 A1 | 6/2014 | Govindaraju |
| 2014/0188412 A1 | 7/2014 | Mahajan et al. |
| 2014/0188738 A1 | 7/2014 | Huxham |
| 2014/0200051 A1 | 7/2014 | Liu |
| 2014/0215196 A1 | 7/2014 | Berlin |
| 2014/0245444 A1 | 8/2014 | Lutas et al. |
| 2014/0254381 A1 | 9/2014 | Racz et al. |
| 2014/0267332 A1 | 9/2014 | Chhabra et al. |
| 2014/0279523 A1 | 9/2014 | Lynam et al. |
| 2014/0279556 A1 | 9/2014 | Priebatsch et al. |
| 2014/0279558 A1 | 9/2014 | Kadi et al. |
| 2014/0298026 A1 | 10/2014 | Isozaki et al. |
| 2015/0032976 A1 | 1/2015 | Chapier et al. |
| 2015/0106805 A1 | 4/2015 | Melander et al. |
| 2015/0172928 A1 | 6/2015 | Katzer et al. |
| 2015/0358455 A1 | 12/2015 | Mosher et al. |
| 2016/0004876 A1 | 1/2016 | Bye et al. |
| 2016/0142396 A1 | 5/2016 | McRoberts et al. |
| 2017/0026840 A1 | 1/2017 | Eyal |

FOREIGN PATENT DOCUMENTS

| | | |
|---|---|---|
| WO | WO2012064171 A1 | 5/2012 |
| WO | WO2012085593 A1 | 6/2012 |
| WO | WO2013170228 A2 | 11/2013 |
| WO | WO2014004590 A2 | 1/2014 |
| WO | WO2014018575 A2 | 1/2014 |
| WO | WO2014025687 A2 | 2/2014 |
| WO | WO2014158431 A1 | 10/2014 |

OTHER PUBLICATIONS

Final Office Action dated Apr. 7, 2015, U.S. Appl. No. 13/844,145, filed Mar. 15, 2013.
Notice of Allowance dated Jul. 6, 2015, U.S. Appl. No. 13/844,145, filed Mar. 15, 2013.
FAIPP Pre-Interview Communication dated Mar. 1, 2016, U.S. Appl. No. 13/863,376, filed Apr. 15, 2013.
Notice of Allowance dated May 2, 2016, U.S. Appl. No. 13/863,376, filed Apr. 15, 2013.
FAIPP Pre-Interview Communication dated Apr. 3, 2014, U.S. Appl. No. 13/802,383, filed Mar. 13, 2013.
First Action Interview Office Action dated May 23, 2014, U.S. Appl. No. 13/802,383, filed Mar. 13, 2013.
Notice of Allowance dated Jul. 8, 2014, U.S. Appl. No. 13/802,383, filed Mar. 13, 2013.
FAIPP Pre-Interview Communication dated Feb. 12, 2015, U.S. Appl. No. 14/066,661, filed Oct. 29, 2013.
Notice of Allowance dated Jul. 6, 2015, U.S. Appl. No. 14/066,661, filed Oct. 29, 2013.
Restriction Requirement dated Aug. 14, 2014, U.S. Appl. No. 13/594,777, filed Aug. 25, 2012.
Notice of Allowance dated Dec. 3, 2014, U.S. Appl. No. 13/594,777, filed Aug. 25, 2012.
Notice of Allowance dated Nov. 9, 2015, U.S. Appl. No. 14/659,614, filed Mar. 17, 2015.
FAIPP Pre-Interview Communication dated Jul. 17, 2014, U.S. Appl. No. 13/594,778, filed Aug. 25, 2012.
Notice of Allowance dated Sep. 19, 2014, U.S. Appl. No. 13/594,778, filed Aug. 25, 2012.
FAIPP Pre-Interview Communication dated Jul. 17, 2014, U.S. Appl. No. 13/594,779, filed Aug. 25, 2012.
First Action Interview Office Action dated Dec. 3, 2014, U.S. Appl. No. 13/594,779, filed Aug. 25, 2012.
Notice of Allowance dated Aug. 14, 2015, U.S. Appl. No. 13/594,779, filed Aug. 25, 2012.
Office Action dated May 7, 2014, U.S. Appl. No. 13/786,450, filed Mar. 5, 2013.
Final Office Action dated Nov. 7, 2014, U.S. Appl. No. 13/786,450, filed Mar. 5, 2013.
Notice of Allowance dated Feb. 26, 2015, U.S. Appl. No. 13/786,450, filed Mar. 5, 2013.
FAIPP Pre-Interview Communication dated Aug. 6, 2014, U.S. Appl. No. 13/831,486, filed Mar. 14, 2013.
Notice of Allowance dated Sep. 26, 2014, U.S. Appl. No. 13/831,486, filed Mar. 14, 2013.
FAIPP Pre-Interview Communication dated Nov. 17, 2014, U.S. Appl. No. 13/802,404, filed Mar. 13, 2013.
First Action Interview Office Action dated Apr. 7, 2015, U.S. Appl. No. 13/802,404, filed Mar. 13, 2013.
Final Office Action dated Aug. 27, 2015, U.S. Appl. No. 13/802,404, filed Mar. 13, 2013.
Advisory Action dated Nov. 16, 2015, U.S. Appl. No. 13/802,404, filed Mar. 13, 2013.
Office Action dated May 17, 2016, U.S. Appl. No. 13/802,404, filed Mar. 13, 2013.
Notice of Allowance dated Nov. 18, 2016, U.S. Appl. No. 13/802,404, filed Mar. 13, 2013.
FAIPP Pre-Interview Communication dated Dec. 16, 2014, U.S. Appl. No. 13/898,435, filed May 20, 2013.
Notice of Allowance dated Feb. 20, 2015, U.S. Appl. No. 13/898,435, filed May 20, 2013.
FAIPP Pre-Interview Communication dated Mar. 26, 2015, U.S. Appl. No. 13/939,175, filed Jul. 10, 2013.
Notice of Allowance dated Jul. 7, 2015, U.S. Appl. No. 13/939,175, filed Jul. 10, 2013.
FAIPP Pre-Interview Communication dated Oct. 29, 2014, U.S. Appl. No. 13/844,282, filed Mar. 15, 2013.

(56) References Cited

OTHER PUBLICATIONS

Final Office Action dated Mar. 24, 2015, U.S. Appl. No. 13/844,282, filed Mar. 15, 2013.
Advisory Action dated Jun. 10, 2015, U.S. Appl. No. 13/844,282, filed Mar. 15, 2013.
Office Action dated Aug. 24, 2015, U.S. Appl. No. 13/844,282, filed Mar. 15, 2013.
Notice of Allowance dated Feb. 26, 2016, U.S. Appl. No. 13/844,282, filed Mar. 15, 2013.
FAIPP Pre-Interview Communication dated Oct. 21, 2014, U.S. Appl. No. 13/844,325, filed Mar. 15, 2013.
Notice of Allowance dated Dec. 19, 2014, U.S. Appl. No. 13/844,325, filed Mar. 15, 2013.
Notice of Allowance dated Jan. 2, 2015, U.S. Appl. No. 13/831,463, filed Mar. 14, 2013.
European Examination Report dated Jun. 1, 2016, EPC Application Serial No. 14775613.4, filed on Jul. 8, 2015.
FAIPP Pre-Interview Communication dated Mar. 24, 2015, U.S. Appl. No. 13/964,112, filed Aug. 12, 2013.
Notice of Allowance dated Aug. 3, 2015, U.S. Appl. No. 13/964,112, filed Aug. 12, 2013.
Office Action dated Aug. 25, 2016, U.S. Appl. No. 13/860,338, filed Apr. 10, 2013.
Restriction Requirement dated Jan. 12, 2016, U.S. Appl. No. 13/912,190, filed Jun. 6, 2013.
FAIPP Pre-Interview Communication dated Mar. 11, 2016, U.S. Appl. No. 13/912,190, filed Jun. 6, 2013.
Notice of Allowance dated Aug. 24, 2016, U.S. Appl. No. 13/912,190, filed Jun. 6, 2013.
FAIPP Pre-Interview Communication dated Apr. 15, 2015, U.S. Appl. No. 14/085,474, filed Nov. 20, 2013.
Notice of Allowance dated May 29, 2015, U.S. Appl. No. 14/085,474, filed Nov. 20, 2013.
FAIPP Pre-Interview Communication dated Mar. 20, 2014, U.S. Appl. No. 13/482,731, filed May 29, 2012.
Notice of Allowance dated May 27, 2014, U.S. Appl. No. 13/482,731, filed May 29, 2012.
FAIPP Pre-Interview Communication dated Oct. 24, 2012, U.S. Appl. No. 13/463,797, filed May 3, 2012.
Notice of Allowance dated Mar. 1, 2013, U.S. Appl. No. 13/463,797, filed May 3, 2012.
FAIPP Pre-Interview Communication dated Jun. 12, 2013, U.S. Appl. No. 13/440,980, filed Apr. 5, 2012.
Final Office Action dated Sep. 9, 2013, U.S. Appl. No. 13/440,980, filed Apr. 5, 2012.
Notice of Allowance dated Nov. 29, 2013, U.S. Appl. No. 13/440,980, filed Apr. 5, 2012.
FAIPP Pre-Interview Communication dated Oct. 24, 2012, U.S. Appl. No. 13/463,801, filed May 3, 2012.
Notice of Allowance dated Mar. 14, 2013, U.S. Appl. No. 13/463,801, filed May 3, 2012.
FAIPP Pre-Interview Communication dated Jul. 25, 2013, U.S. Appl. No. 13/470,203, filed May 11, 2012.
Final Office Action dated Mar. 27, 2014, U.S. Appl. No. 13/470,203, filed May 11, 2012.
Advisory Action dated May 29, 2014, U.S. Appl. No. 13/470,203, filed May 11, 2012.
Office Action dated Aug. 29, 2014, U.S. Appl. No. 13/470,203, filed May 11, 2012.
Notice of Allowance dated Dec. 22, 2014, U.S. Appl. No. 13/470,203, filed May 11, 2012.
FAIPP Pre-Interview Communication dated Jul. 2, 2015, U.S. Appl. No. 14/632,850, filed Feb. 26, 2015.
Final Office Action dated Nov. 6, 2015, U.S. Appl. No. 14/632,850, filed Feb. 26, 2015.
Advisory Action dated Jan. 29, 2016, U.S. Appl. No. 14/632,850, filed Feb. 26, 2015.
Examiner's Answer dated Nov. 16, 2016, U.S. Appl. No. 14/632,850, filed Feb. 26, 2015.
FAIPP Pre-Interview Communication dated May 12, 2014, U.S. Appl. No. 13/294,177, filed Nov. 11, 2011.
Notice of Allowance dated Oct. 8, 2014, U.S. Appl. No. 13/294,177, filed Nov. 11, 2011.
FAIPP Pre-Interview Communication dated Mar. 25, 2015, U.S. Appl. No. 13/532,588, filed Jun. 25, 2012.
FAIPP Office Action Sep. 15, 2015, U.S. Appl. No. 13/532,588, filed Jun. 25, 2012.
Notice of Allowance dated Nov. 5, 2015, U.S. Appl. No. 13/532,588, filed Jun. 25, 2012.
Supplemental Notice of Allowance dated Nov. 16, 2015, U.S. Appl. No. 13/532,588, filed Jun. 25, 2012.
FAIPP Pre-Interview Communication dated Sep. 25, 2014, U.S. Appl. No. 13/533,969, filed Jun. 27, 2012.
Notice of Allowance dated Feb. 5, 2015, U.S. Appl. No. 13/533,969, filed Jun. 27, 2012.
FAIPP Pre-Interview Communication dated Jun. 6, 2013, U.S. Appl. No. 13/571,348, filed Aug. 10, 2012.
Office Action dated Sep. 25, 2013, U.S. Appl. No. 13/571,348, filed Aug. 10, 2012.
Final Office Action dated Apr. 10, 2014, U.S. Appl. No. 13/571,348, filed Aug. 10, 2012.
Advisory Action dated Jun. 23, 2014, U.S. Appl. No. 13/571,348, filed Aug. 10, 2012.
Office Action dated Dec. 15, 2014, U.S. Appl. No. 13/571,348, filed Aug. 10, 2012.
Notice of Allowance dated Jun. 17, 2015, U.S. Appl. No. 13/571,348, filed Aug. 10, 2012.
Restriction Requirement dated Jan. 2, 2015, U.S. Appl. No. 13/762,319, filed Feb. 7, 2013.
FAIPP Pre-Interview Communication dated Mar. 10, 2015, U.S. Appl. No. 13/762,319, filed Feb. 7, 2013.
Notice of Allowance dated Jun. 9, 2015, U.S. Appl. No. 13/762,319, filed Feb. 7, 2013.
Notice of Allowance dated Aug. 30, 2013, U.S. Appl. No. 13/540,437, filed Jul. 2, 2012.
FAIPP Pre-Interview Communication dated May 21, 2015, U.S. Appl. No. 14/090,667, filed Nov. 26, 2013.
Notice of Allowance dated Aug. 4, 2015, U.S. Appl. No. 14/090,667, filed Nov. 26, 2013.
Restriction Requirement dated Nov. 1, 2013, U.S. Appl. No. 13/557,213, filed Jul. 25, 2012.
Office Action dated Dec. 19, 2013, U.S. Appl. No. 13/557,213, filed Jul. 25, 2012.
Notice of Allowance dated Jun. 4, 2014, U.S. Appl. No. 13/557,213, filed Jul. 25, 2012.
FAIPP Pre-Interview Communication dated Nov. 27, 2013, U.S. Appl. No. 13/610,856, filed Sep. 11, 2012.
Notice of Allowance dated Jan. 31, 2014, U.S. Appl. No. 13/610,856, filed Sep. 11, 2012.
FAIPP Pre-Interview Communication dated Jun. 5, 2013, U.S. Appl. No. 13/556,200, filed Jul. 24, 2012.
First Action Interview Office Action dated Aug. 19, 2013, U.S. Appl. No. 13/556,200, filed Jul. 24, 2012.
Notice of Allowance dated Oct. 16, 2013, U.S. Appl. No. 13/556,200, filed Jul. 24, 2012.
Notice of Allowance dated Sep. 21, 2015, U.S. Appl. No. 14/148,714, filed Jan. 6, 2014.
European Examination Report dated Mar. 3, 2016, EPC Application Serial No. 13822974.5, filed on Jan. 8, 2015.
FAIPP Pre-Interview Communication dated Aug. 4, 2014, U.S. Appl. No. 13/844,357, filed Mar. 15, 2013.
Notice of Allowance dated Oct. 6, 2014, U.S. Appl. No. 13/844,357, filed Mar. 15, 2013.
Paczkowski, Lyle W., et al., "System and Method for Secure USIM Wireless Network Access," filed Nov. 20, 2015, U.S. Appl. No. 14/947,257.
Office Action dated Mar. 8, 2017, U.S. Appl. No. 14/947,257, filed Nov. 20, 2015.
FAIPP Pre-Interview Communication dated Mar. 21, 2017, U.S. Appl. No. 14/855,364, filed Sep. 15, 2015.
European Examination Report dated Feb. 14, 2017, EPC Application Serial No. 14775613.4, filed on Jul. 8, 2015.

(56) References Cited

OTHER PUBLICATIONS

Final Office Action dated Mar. 9, 2017, U.S. Appl. No. 13/860,338, filed Apr. 10, 2013.
FAIPP Office Action dated Apr. 5, 2017, U.S. Appl. No. 14/596,218, filed Jan. 14, 2015.
Notice of Allowance dated Mar. 10, 2017, U.S. Appl. No. 15/069,921, filed Mar. 14, 2016.
Bye, Stephen James, et al., "Delivering Digital Content to a Mobile Device via a Digital Rights Clearing House", filed Apr. 10, 2013, U.S. Appl. No. 13/860,338.
McCracken, Billy Gene, Jr., et al. "Mobile Communication Device Profound Identity Brokering Framework", filed Nov. 30, 2016, U.S. Appl. No. 15/365,934.
Neson, Tracy L., et al., "Mated Universal Serial Bus (USB) Wireless Dongles Configured with Destination Addresses," filed Jan. 26, 2015, U.S. Appl. No. 14/606,011.
Paczkowski, Lyle W., et al., "Trusted Code Generation and Verification to Prevent Fraud from Maleficent External Devices that Capture Data," filed Jan. 14, 2015, U.S. Appl. No. 14/596,218.
Cordes, Kevin R., et al., "Digest of Biographical Information for an Electronic Device with Static and Dynamic Portions," filed Mar. 14, 2016, U.S. Appl. No. 15/069,921.
FAIPP Pre-Interview Communication dated Feb. 4, 2015, U.S. Appl. No. 14/075,663, filed Nov. 8, 2013.
First Action Interview Office Action dated Apr. 10, 2015, U.S. Appl. No. 14/075,663, filed Nov. 8, 2013.
Notice of Allowance dated Jul. 1, 2015, U.S. Appl. No. 14/075,663, filed Nov. 8, 2013.
FAIPP Pre-Interview Communication dated Feb. 24, 2015, U.S. Appl. No. 14/163,047, filed Jan. 24, 2014.
Notice of Allowance dated Apr. 9, 2015, U.S. Appl. No. 14/163,047, filed Jan. 24, 2014.
Notice of Allowance dated Jul. 22, 2015, U.S. Appl. No. 14/229,532, filed Mar. 28, 2014.
Notice of Allowance dated Aug. 28, 2015, U.S. Appl. No. 14/446,330, filed Jul. 29, 2014.
FAIPP Pre-Interview Communication dated Aug. 8, 2016, U.S. Appl. No. 14/596,218, filed Jan. 14, 2015.
FAIPP Pre-Interview Communication dated Nov. 18, 2015, U.S. Appl. No. 14/681,077, filed Apr. 7, 2015.
First Action Interview Office Action dated Mar. 28, 2016, U.S. Appl. No. 14/681,077, filed Apr. 7, 2015.
Notice of Allowance dated Jun. 15, 2016, U.S. Appl. No. 14/681,077, filed Apr. 7, 2015.
FAIPP Pre-Interview Communication dated Aug. 5, 2015, U.S. Appl. No. 13/857,141, filed Apr. 4, 2013.
Notice of Allowance dated Dec. 17, 2015, U.S. Appl. No. 13/857,141, filed Apr. 4, 2013.
FAIPP Pre-Interview Communication dated Oct. 5, 2016, U.S. Appl. No. 15/069,921, filed Mar. 14, 2016.
Restriction Requirement dated Jan. 5, 2015, U.S. Appl. No. 13/857,139, filed Apr. 4, 2013.
FAIPP Pre-Interview Communication dated Jun. 2, 2015, U.S. Appl. No. 13/857,139 filed Apr. 4, 2013.
Office Action dated Nov. 19, 2015, U.S. Appl. No. 13/857,139, filed Apr. 4, 2013.
Notice of Allowance dated May 26, 2016, U.S. Appl. No. 13/857,139, filed Apr. 4, 2013.
FAIPP Pre-Interview Communication dated Mar. 2, 2015, U.S. Appl. No. 13/857,138, filed Apr. 4, 2013.
First Action Interview Office Action dated Apr. 20, 2015, U.S. Appl. No. 13/857,138, filed Apr. 4, 2013.
Notice of Allowance dated Jun. 11, 2015, U.S. Appl. No. 13/857,138, filed Apr. 4, 2013.
FAIPP Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.
Notice of Allowance dated Jan. 28, 2014, U.S. Appl. No. 12/486,873, filed Jun. 18, 2009.
Zimmerman, Ann, "Check Out the Future of Shopping", The Wall Street Journal, Business, May 18, 2011, http://online.wsj.com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Foreign Communication from a Related Counterpart—International Search Report and Written Opinion, dated Dec. 2, 2013, PCT/US13/40673, filed on May 10, 2013.
Foreign Communication from a Related Counterpart—International Preliminary Report on Patentability, dated Nov. 20, 2014, PCT/US13/40673, filed on May 10, 2013.
Giesecke & Devrient, "The OTA Platform in the World of LTE", Jan. 2011, http://www.gi-de.com/gd_media/media/en/documents/brochures/mobile_security_2/cste_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 1, 2014, PCT/US13/47729, filed on Jun. 25, 2013.
Foreign Communication from a Related Counterpart—International Preliminary Report on Patentability, dated Jan. 3, 2015, PCT/US13/47729, filed on Jun. 25, 2013.
Foreign Communication from a Related Counterpart—International Search Report and Written Opinion, dated Apr. 22, 2014, PCT/US13/53617, filed on Aug. 5, 2013.
Foreign Communication from a Related Counterpart—International Preliminary Report on Patentability, dated Feb. 19, 2015, PCT/US13/53617, filed on Aug. 5, 2013.
Foreign Communication from a Related Counterpart—International Search Report and Written Opinion, dated Feb. 1, 2014, PCT/US13/51750, filed on Jul. 24, 2013.
Foreign Communication from a Related Counterpart—International Preliminary Report on Patentability, dated Feb. 5, 2015, PCT/US13/51750, filed on Jul. 24, 2013.
Foreign Communication from a Related Counterpart—International Search Report and Written Opinion, dated Jul. 11, 2014, PCT/US14/16651, filed on Feb. 16, 2014.
Foreign Communication from a Related Counterpart—International Preliminary Report on Patentability, dated Sep. 24, 2015, PCT/US14/16651, filed on Feb. 16, 2014.
Ahmed, Farid, et al., "Correlation-based Watermarking Method for Imagine Authentication Applications", Society of Photo-Optical Instrumentation Engineers, Feb. 17, 2004, pp. 1834-1838.
Perrig, Adrian, et al., "SPINS: Security Protocols for Sensor Networks," ACM, Sep. 2002, vol. 8, pp. 521-534.
Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp.jsp?tp=&arnumber=5513119.
Lee, Jeremy, et al., "A Low-Cost Solution for Protecting IPs Against Scan-Based Side Channel Attacks," 24th IEEE VLSI Test Symposium. Pub. Date: 2006. http//ieeexplore.ieee.org/stamp/stamp.jsp?tp=&arnumber= 1617569.
Henderson, Tristan, et al., "On the Wire, Congestion Pricing: Paying Your Way in Communications Networks," University College London, Sep./Oct. 2001, retrieved from: http://tristan.host.cs.st-andrews.ac.uk!research/pubs/ieeeic01.pdf.
Dietrich, Kurt, et al., "Implementation Aspects of Mobile and Embedded Trusted Computing," Institute for Applied Information Processing and Communications, Trusted Computing Interaction Conference, 2009.

(56) References Cited

OTHER PUBLICATIONS

Eastlake, 3rd Motorola labs T Hansen AT&T Labs D: "US Secure Hash Algorithms," MPEG Meeting Mar. 16, 2011 to Mar. 23, 2011, Geneva, XP15047395A, ISSN: 0000-0003. [32602].

Hamdare, Safa, et al., "Securing SMS Based One Time Password Technique from Man in the Middle Attach," IJETT, vol. 11 Issue 3, May 2014. [53500].

Notice of Allowance dated Jul. 6, 2017, U.S. Appl. No. 14/855,364, filed Sep. 15, 2015.

Japanese Decision for Grant dated Jun. 6, 2017, JP Application Serial No. 2015-524404.

Advisory Action dated Jun. 1, 2017, U.S. Appl. No. 13/860,338, filed Apr. 10, 2013.

FAIPP Pre-Interview Communication dated Apr. 27, 2017, U.S. Appl. No. 14/606,011, filed Jan. 26, 2015.

Notice of Allowance dated May 30, 2017, U.S. Appl. No. 14/596,218, filed Jan. 14, 2015.

Notice of Allowance dated Jul. 24, 2017, U.S. Appl. No. 14/947,257, filed Nov. 20, 2015.

Twin Connect—"User Guide for Windows"; 30 pages; dated 2013.

wiseGEEK,"What is a USB Dongle?," http://www.wisegeek.com/what-is-a-usb-dongle.htm, four pages, dated Jul. 25, 2017.

\* cited by examiner

HARDWARE ASSISTED PROVENANCE PROOF OF NAMED DATA NETWORKING ASSOCIATED TO DEVICE DATA, ADDRESSES, SERVICES, AND SERVERS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Recent growth in e-commerce, digital media, social networking, and smartphone applications has resulted in the Internet primarily being used as a distribution network. Distribution networks are fundamentally more general than communication networks, and solving distribution problems with a communication network is complex and error prone.

SUMMARY

In an embodiment, a system delivering data content with hardware assisted provenance proof in named data networking (NDN) is disclosed. The system comprises a first client with a trusted security zone enabled, wherein the trusted security zone provides hardware assisted trust, where the first client is configured to send a first request message, wherein the first request message comprises a name that identifies desired data content, receive data content and a digital signature, and determine whether or not the data content is from a corresponding trusted content server based on the digital signature. The system further comprises a data content server with a trusted security zone enabled, configured to receive the first request message from the first client, and transmit the desired data content based on the name comprised in the first request message and a determination that the first client is trusted and that the routing path from the first client to the data content server is trusted. The system further comprises a signature server with a trusted security zone enabled, configured to receive the first request message from the first client, generate a digital signature based on the desired data content, and transmit the corresponding digital signature based on a determination that the first client is trusted and that the routing path from the first client to the signature server is trusted. The system further comprises at least one router each with a trusted security zone enabled, configured to cache the data content and the corresponding digital signature received from the data content server and signature server, and forward the data content and the corresponding digital signature to a second client requesting the data content based on the same name comprised in a second request message from the second client and a determination that the second client is trusted and that the routing path from the second client to the router is trusted.

In an embodiment, a method of delivering data content with hardware assisted provenance proof in a named data networking (NDN) is disclosed. The method comprises sending, by a first client with a trusted security zone enabled, a first request message, wherein the trusted security zone provides hardware assisted trust, wherein the first request message comprises a name that identifies desired data content, receiving, by a data content server and a signature server each with a trusted security zone enabled, the first request message from the first client, and transmitting, by the data content server, the desired data content based on the name comprised in the first request message and a determination that the first client is trusted and that the routing path from the first client to the data content server is trusted. The method further comprises generating, by the signature server, a digital signature based on the desired data content, transmitting, by the signature server, the corresponding digital signature based on a determination that the first client is trusted and that the routing path from the first client to the signature server is trusted, and caching, by at least one router each with a trusted security zone enabled, the data content and the corresponding digital signature received from the data content server and signature server. The method further comprises receiving, by the first client, data content and a digital signature, determining, by the first client, whether or not the data content is from a corresponding trusted content server based on the digital signature and forwarding, by the at least one router, the data content and the corresponding digital signature to a second client requesting the data content based on the same name comprised in a second request message from the second client and a determination that the second client is trusted and that the routing path from the second client to the router is trusted.

In an embodiment, a method of delivering data content with hardware assisted provenance proof in named data networking (NDN) is disclosed. The method comprises sending, by a client with a trusted security zone enabled, a request message, wherein the trusted security zone provides hardware assisted trust, wherein the request message comprises a name that identifies desired data content, receiving, by a content server with a trusted security zone enabled, the request message from the client, and generating, by the content server, a digital signature based on the desired data content. The method further comprises transmitting, by the content server, the desired data content and the corresponding digital signature based on the name comprised in the request message and a determination that the client is trusted and that the routing path from the client to the content server is trusted, and caching, by at least one router each with a trusted security zone enabled, the data content and the corresponding digital signature received from the content server. The method further comprises receiving, by the client, data content and a digital signature and determining, by the client, whether or not the data content is from a corresponding trusted content server based on the digital signature.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
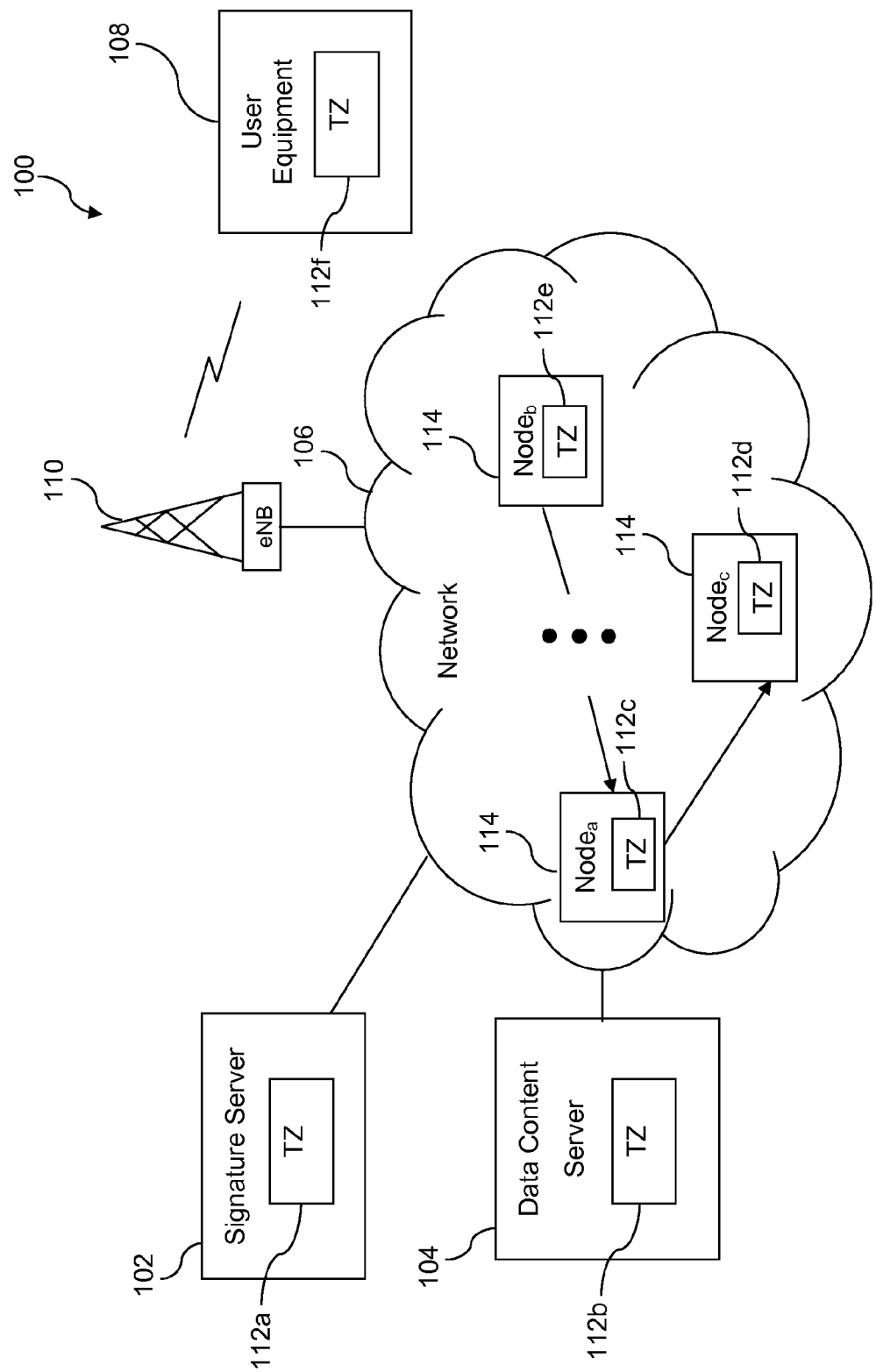
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The IP architecture of the current Internet is based on communications and/or addresses, for example IP addresses of a source and a destination for an Internet "conversation". However, most usage of today's Internet is content based and thus the Internet is mostly used as a distribution network. Solving distribution problems with a communications (based) network is complex and may be error prone. A named data networking (NDN) network, a distribution network, or a content oriented network has been proposed to adjust routing to make it more efficient and minimally enhance security.

Communication in NDN is generally driven by the receiving end, i.e., the data consumer. To receive data, a consumer sends out an interest packet, which carries a name that identifies the desired data. A router in an NDN network may remember the interface from which the request comes in and may then forward the interest packet by looking up the name in its forwarding information base (FIB). The forwarding information base may be populated by a name-based routing protocol. When the interest reaches a node that has the requested data, a data packet may be sent back. The data packet may carry both the name and the content of the data. The data packet may trace in reverse the path created by the interest packet back to the consumer. It should be noted that neither interest packets nor data packets carry any host or interface addresses (such as IP addresses) although IP addresses would eventually be involved in the transmission of the interest and data packets. An NDN data packet may be meaningfully independent of where it comes from or where it may be forwarded to. Routers in an NDN network may cache the NDN data packet to satisfy potential future requests.

NDN does not, however, account for hardware root of trust to make it usable in cases where higher level of security is desirable, such as certain commerce instances. Up to now, communications security has been divorced from the data it tries to secure. For example, it may not be verified whether a piece of data obtained in an NDN network is from where it says it is from and from where it is supposed to be from. Servers and browser endpoints may be connected via secure tunnels, but the endpoints are not trusted to each other at the hardware or chip level. Historically, security based on public key cryptography has been considered inefficient, unusable, and difficult to deploy. A content oriented Internet with hardware assisted security is therefore desirable. The present disclosure teaches a system and method for delivering data content with hardware assisted security and provenance proof in NDN.

Security may be built into data via a trusted security zone implementation of the NDN scheme. For instance, data content may be signed with a digital signature and transmitted via the trusted security zone implementation of the NDN. With the technology of building security into data via a trusted security zone implementation of the NDN scheme, data content may be verified to be from where it says it is from and where it is supposed to be from. Some functionality of layer 3, the network layer, of the open systems interconnections (OSI) model may be moved to upper layers or lower layers of the OSI model, leaving less functionality to be performed at the network layer. Meanwhile, some extra functions may be added to the network layer, such as search function based on names of data content.

A trusted security zone may be enabled in every element of the NDN network to establish trusted end-to-end communication links, for example in clients, routers, servers (such as domain host configuration protocol (DHCP) servers and domain name system (DNS) servers), etc. The trusted security zone provides hardware assisted trust for trusted end-to-end communication. The clients, servers, routers, DHCP servers, and DNS servers may thus be referred to as trusted clients, trusted servers, trusted routers, trusted DHCP servers, and trusted DNS servers, respectively. As described in more detail below, trusted computation and/or trusted communication is based on the hardware assisted security that reduces the ability of nefarious software or corrupt devices to write, read, or otherwise access trusted processing or trusted messages. For further details about establishing trusted end-to-end communication links, see U.S. patent application Ser. No. 13/532,588, filed Jun. 25, 2012, entitled "End-to-end Trusted Communications Infrastructure," by Leo Michael McRoberts, et al., which is hereby incorporated by reference in its entirety.

A first client with a trusted security zone enabled may send a first request message or a first interest packet for some desired data content, for example to request a new widget application. The first request message may comprise a name that identifies the desired data content. The name may be unique at least within a domain or subdomain and may follow predefined rules and/or a predefined hierarchy. For example, the name may be similar in form to a uniform resource identifier (URI). A trustlet may be generated at the client to send the request message in case of commerce use scenarios to provide a higher level of security.

The trustlet may be associated with a communication application. For example, the trustlet may be part of a communication application on the client. An application may be partitioned into a portion comprised of instructions that need not execute in the trusted security zone and a portion comprised of instructions that desirably do execute in the trusted security zone. The portion of instructions of an application that are desirably executed in the trusted security zone may be referred to as a trustlet. A trustlet may be thought of as an extract of a complete application—an extract of the specific instructions that desirably execute in a trusted security zone. The portion of the application that need not execute in the trusted security zone may be said to execute in the rich environment or permissive environment.

At least one trusted router may receive the request message, remember the interface from which the request message comes in, and then forward the request message by looking up the name in its forwarding information base (FIB). The trusted router may forward the request message based on the name comprised in the request message and a determination that the sender of the request message, the first client or a previous router on the routing path from the first client to the trusted router, is trusted and that the routing path from the first client to the trusted router is trusted.

For example, a trustlet may be generated in each router along the routing path to communicate with other routers. Similarly, the data content server and signature server may each generate a trustlet to communicate with each other and/or the trusted routers. A separate notification or message may be transmitted by an entity to the next entity along the routing path, for example through trustlets on both entities, indicating that the routing path from the previous entity to the entity has been verified to be trusted. This type of notification may be accumulated and/or forwarded to following entities along the routing path via communication between trustlets or other trusted applications that execute in the trusted security zone of the entities. The forwarding information base may be populated by a name-based routing protocol.

A trusted data content server may receive the first request message transmitted from the first client and forwarded by the trusted router(s). The trusted data content server may then transmit the desired data content based on the name comprised in the first request message and a determination that the first client is trusted and that the routing path from the first client to the data content server is trusted. The determination process for whether the routing path from the first client to the data content server is trusted may comprise determining whether or not network node(s), such as domain name system servers and domain host configuration protocol servers, along the routing path are trusted. The determination process for whether the routing path from the first client to the data content server is trusted may also comprise determining whether any linkage to outside a trusted routing path can be detected. If any linkage to outside the trusted routing path is detected, the routing path is determined to be untrusted.

A trusted signature server may receive the first request message transmitted from the first client or a signature request message transmitted from the data content server. The signature server and the data content server may locate in one computer—for example, a server computer, in two different computers—for example, a server computer for the data content server, and another computer for the signature server, in multiple different computers—for example, multiple server computers for the data content server, and other multiple computers for the signature server, or in some other combination of computers.

The trusted signature server may generate a digital signature based on the desired data content. For example, the trusted signature server may generate a specific digital signature for a group of data content. When the desired data content comprises more than one piece of data content, these pieces of data content may be called a group of data content. The more than one piece of data content may be stored by more than one data content server. The digital signature may be generated based on the data content and/or data content server(s) that store or manage the data content. For example, the digital signature for a specific group of data content may comprise information of the group of data content and the data content server(s) that manage the group of data content. Alternatively, the digital signature may be encoded based on information of the data content and/or the data content server(s) that manage the data content. The signature server may then transmit the generated digital signature based on a determination that the first client is trusted and that the routing path from the first client to the signature server is trusted. The determination process for whether the routing path from the first client to the signature server is trusted may comprise determining whether or not network node(s), such as domain name system servers and domain host configuration protocol servers, along the routing path are trusted. The determination process for whether the routing path from the first client to the signature server is trusted may also comprise determining whether any linkage to outside the trusted routing path can be detected.

The trusted router(s) along the routing path from the data content server to the trusted client may cache the data content received from the data content server. Similarly, the trusted router(s) along the routing path from the signature server to the trusted client may cache the corresponding digital signature received from the signature server. The trusted router(s) may forward the data content and/or the corresponding digital signature to a second trusted client requesting the data content based on the same name comprised in a second request message from the second trusted client and a determination that the second trusted client is trusted and that the routing path from the second client to the trusted router is trusted.

In an embodiment, a key may also be transmitted separately from the data content by the data content server upon receipt of a key request from a client after a determination that the client is trusted and a determination that a routing path from the client to the data content server is trusted. The key may be a public key of the data content server. The key may be stored in a place separate from where the digital signature or the data content is stored. For example, the key may be stored in a first trusted security subzone of the data content server and the data content may be stored in a second trusted security subzone. Alternatively, the key may be stored in a trusted data store coupled to the data content server and the data content may be stored in a trusted security zone in the memory of the data content server.

The key distribution may be performed by the data content server as a second piece of data content. In other words, the key may be distributed in a way similar to how data content is distributed. An application programming interface (API) may be utilized for key distribution. For example, an application programming interface on the data content server may manage key distribution. Alternatively, a third party may manage the key delivery so that the key delivery is separate from the data content delivery.

The key may be utilized by the client to decrypt the digital signature that comes with the data content. The key and the data content may be combined into a single type length value (TLV) element by a first trusted router along the routing path from the data content server to the client after the data content server transmits the data content and the key separately.

When the first client receives the desired data content along with a digital signature, the first client may determine whether or not the data content is transmitted from a proper trusted content server based on the digital signature. In other words, the first client may determine whether the data content is from where it says it is from and whether the data content is from where it is supposed to be from. Information regarding whether the data content is from where it says it is from may be determined based on whether the entities along the routing path are all trusted and whether any linkages to outside the trusted routing path have been detected. In an embodiment, the digital signature may comprise identification information of the content server so that the provenance of the data content may be examined and validated based on the digital signature and thus information regarding whether the data content is from where it is supposed to be from may be determined.

When the desired data content comprises more than one piece of data content from more than one data content server, only one digital signature may be generated and transmitted by the signature server for the pieces of data content. The pieces of data content may be combined upon receipt at the client.

With the above technology of building security into data via a trusted security zone implementation of the NDN scheme, data content may be verified to be from where it says it is from and where it is supposed to be from. Some functionality of layer 3, the network layer, of the open systems interconnection (OSI) model may be moved to upper layers or lower layers of the OSI model, leaving less functionality to be performed by the network layer. Meanwhile, some extra functions may be added to the network layer, such as search function based on names of data content.

In an embodiment, a trusted domain name system server may process both normal translation requests and trusted translation requests. Alternatively, in an embodiment, a trusted domain name system may process only trusted translation requests sent by requesting hosts executing in their trusted security zones and sent via a trusted end-to-end communication link. In an embodiment, the trusted domain system server may provide translations of domain names to trusted internet protocol addresses. The present disclosure contemplates the trusted domain name system servers promoting a new set of top level domain names and/or category of domain names that are trusted. These trusted top level domain names may have identifiers such as ".tgov," ".tcom," ".tedu," ".tnet," ".tru," and other such domain identifiers, each of which incorporate the letter 't' to designate their trusted property. It is understood that domain names in the top level domains such as ".tgov," ".tcom," ".tedu," ".tnet," ".tru" would translate to trusted IP addresses.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. The secure partition may be implemented by a first physical processor, and the normal partition may be implemented by a second physical processor. Alternatively, the secure partition may be implemented by a first virtual processor, and the normal partition may be implemented by a second virtual processor. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the Trusted Execution Environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1, a communication system 100 is described. In an embodiment, the communication system 100 comprises a plurality of user equipments (UE) 108, a plurality of network nodes 114, a signature server 102, and a plurality of data content servers 104. The user equipment 108 may alternatively be referred to in some contexts as a mobile communication device. The user equipment 108 may be configured to use a radio transceiver to establish a wireless communication link with an enhanced Node B (eNB) 110, and the eNB 110 may communicatively couple the UE 108 to a network 106. The eNB 110 may alternatively be referred to in some contexts as a base transceiver station (BTS). The data content servers 104 and the signature server 102 may also be communicatively coupled to the network 106. The network nodes 114 may be considered to embody, at least in part, the network 106. The network 106 may comprise any combination of private and public networks.

The user equipment 108, the signature server 102, the data content server 104, and the network node 114 may each comprise a trusted security zone 112 and may perform secure communication with the trusted security zone 112 enabled. The user equipment 108, the signature server 102, the data content server 104, and the network node 114 with the trusted security zone 112 enabled may be called the trusted user equipment 108, the trusted signature server 102, the trusted data content server 104, and the trusted network node 114 hereinafter.

It is understood that the system 100 may comprise any number of user equipments 108, any number of network nodes 114, any number of signature servers 102, any number of data content servers 104, and any number of eNBs 110. The collectivity of eNBs 110 may be said to comprise a radio access network (RAN), in that these eNBs 110 may provide a radio communication link to the user equipments 108 to provide access to the network 106. The radio transceiver of the user equipment 108 may communicate with the eNB 110 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol.

The network nodes 114 may comprise a first network node 114a, a second network node 114b, and a third network node 114c. The network nodes 114 may be any of network routers, network switches, media access gateways (MAGs), domain name system (DNS) servers, domain host configuration protocol (DHCP) servers, and other data communication networking equipment. The network nodes 114 may be abstracted as a network cloud or as a communication infrastructure.

While a smart phone is used in the role of UE 108, in a preferred embodiment, the teachings of the present disclosure may also be extended to other mobile communication devices such as a laptop computer, a notebook computer, a tablet computer, a mobile phone, a personal digital assistant (PDA), a media player, a headset computer, a wearable computer, a game console, an Internet digital media streaming device, a television, or another network/communications capable device. In an embodiment, the user equipment 108 may have other components (not shown) such as a near field communication (NFC) radio transceiver, a short range radio transceiver such as a wireless local area network radio transceiver, or other components.

The signature server 102 and the data content server 104 may be server computers. The server 102 and the data content server 104 may be located in one computer—for example a server computer, in two different computers—for example, a server computer for the signature server 102 and another computer for the data content server 104, in multiple different computers—for example, multiple server computers for the signature server 102 and other multiple computers for the data content server 104, or in some other combination of computers. When the signature server 102 and the data content server 104 are not located in one computer, the signature server 102 and the data content server 104 may share the same wired or wireless local area network.

As described above, the trusted security zone 112 may be provided by a physically separate processor or by a virtual processor. Secure application(s) may execute in the trusted security zone 112 and may be any of a variety of applications that process and/or transmit confidential information. The confidential information may comprise sensitive business documents such as electronic mail, marketing literature, business plans, client lists, addresses, employee data, intellectual property documents, and the like. The confidential information may comprise personal medical records or medical data that are subject to privacy requirements enforced by government regulatory bodies or commercial standards. The confidential information may comprise premium media content such as premium music or movies. The confidential information may comprise financial information such as account numbers, authentication identities, account balance information, and the like.

When processing and/or transmitting the confidential information, the secure application executes at least partially in the trusted security zone 112. It is a characteristic or feature of the trusted security zone 112, as described more fully above, that when the secure application executes in the trusted security zone 112, untrusted applications are prevented from executing and/or accessing trusted memory partitions and/or accessing the display or input devices of the electronic device, thereby reducing the opportunity for malware that may have infiltrated the electronic device to corrupt or to monitor the confidential information.

When a UE 108 sends a request message or an interest packet for some desired data content, for example to request a new widget, the request message may comprise a name that identifies the desired data content. The request message may be in a variety of forms, for example a type length value or tag value length (TLV) request. The name may be unique at least within a domain or subdomain and may follow predefined rules, for example a predefined hierarchy and/or structure, similar to a uniform resource identifier (URI). For instance, the request message may comprise the name EverythingButWeather.weather-first.v4 of the widget.

A first trusted router 114 may receive the request message from the UE 108, remember the interface from which the request message comes in, and then forward the request message. The first trusted router 114 may forward the request message based on the name comprised in the request message and a determination that the sender of the request message, the UE 108 in this case, is trusted and that the routing path from the UE 108 to the first trusted router 114 is trusted. For instance, the first trusted router 114 may forward the request message by looking up the name in its forwarding information base (FIB). The forwarding information base may be trusted, for example stored within the trusted security zone and executed by a trusted application in the trusted security zone. The forwarding information base may be populated by a name-based routing protocol.

A trustlet may be generated in each trusted router 114 along the routing path to communicate with other routers. Similarly, the data content server 104 and signature server 102 may each generate a trustlet to communicate with each other and/or the trusted routers 114. A separate notification or message may be transmitted by an entity to the next entity along the routing path, for example through trustlets on both entities, indicating that the routing path from the previous entity to the entity has been verified to be trusted. This type of notification may be accumulated and/or forwarded to following entities along the routing path via communication between trustlets or other trusted applications that execute in the trusted security zone 112 of the entities.

The first trusted router 114 may store state information associated with the request message such as the name of the desired data content and/or the interface from which the request message comes in. In an embodiment, the state information associated with the request message may be stored by the first trusted router 114 in a pending interest table (PIT). The pending interest table may be trusted, for example stored and executed within the trusted security zone. When a second request message is transmitted and then received at the first trusted router 114 requesting the same content data, for example with the same name of desired content data, the second request message and/or the interface from which the second request message comes in may also be recorded in the pending interest table. In an embodiment, the second request message for the same data content may not be forwarded by the trusted router 114. Instead, the first trusted router 114 may wait until the requested data content is received at the router and forward the requested data content to a second UE that transmitted the second request message under predefined circumstances.

The routing path from the UE 108 to a corresponding data content server 104 that stores and/or manages the desired data content may comprise more than one trusted router 114. Future trusted router(s) 114 along the routing path from the UE 108 to the data content server 104 may perform similar functions as the first trusted router 114. In other words, there may be no linkage to outside these trusted domains.

When the request message reaches the trusted data content server 104 that stores and/or manages the requested data content, a data packet may be transmitted back. The data packet may comprise the name and/or the requested data content. The data packet may trace in reverse the routing path created by the request message back to the UE 108 that requested the data content. In other words, the data packet is routed back to the UE 108 based on state information stored in the trusted router(s) 114 associated with the request message/the name of the data content.

The trusted router(s) 114 along the routing path from the data content server 104 to the trusted UE 108 may cache the data packet/data content received from the data content server 104. In an embodiment, each trusted router 114 along the routing path may cache a copy of the data content. Similarly, the trusted router(s) 114 along the routing path from the signature server 102 to the trusted UE 108 may cache a corresponding digital signature received from the signature server 102. As briefly discussed above, the trusted router(s) 114 may forward the data packet or data content and the corresponding digital signature to a second trusted UE 108 requesting the data content based on the same name comprised in a second request message from the second UE 108, state information stored in the router(s) 114 for the name, and/or a determination that the second UE 108 is trusted and that the routing path from the second UE 108 to the trusted router 114 is trusted.

The trusted data content server 104 may comprise a memory and a processor. A content distribution application may be stored in the memory of the trusted data content server 104 and may be executed by the processor of the trusted data content server 104. The content distribution application or the data content server 104 may perform a variety of functionality to distribute data content. For example, the data content server 104 may receive request messages, determine whether or not the requesting UE 108 from which the request message is transmitted is trusted, determine whether or not the routing path from the requesting UE 108 to the data content server 104 is trusted, transmit data content based on results of the above determination, communicate with a corresponding signature server 102 on status of transmission of data content and/or signatures, and the like.

For example, the data content server 104 may receive the request message transmitted by the UE 108 and/or forwarded by the trusted router(s) 114. In an embodiment, the data content server 104 may identify the name comprised in the request message and locate the desired data content in the memory or a data store of the data content server 104 based on the name. The trusted data content server 104 may then transmit the desired/located data content to the requesting UE 108 under predefined circumstances. For instance, the trusted data content server 104 may transmit the located data content based on a determination that the UE 108 is trusted and the routing path from the UE 108 to the data content server 104 is trusted. The determination process for whether the routing path from the UE 108 to the data content server 104 is trusted may comprise determining whether any linkage to outside a trusted routing path can be detected. If any linkage to outside the trusted routing path is detected, the routing path may be determined to be untrusted.

The data content server 104 may determine whether or not the UE 108 is trusted by examining and validating a trust token transmitted by the UE 108. The trust token may have been built by the UE 108. Alternatively, the data content server 104 may determine whether or not the UE 108 is trusted based on status of handshake between the UE 108 and the data content server 104 or via some other mechanism. The data content server 104 may determine whether or not the routing path from the UE 108 to the data content server 104 is trusted by examining trust tokens that are built and provided by previous network node(s) 114 along the routing path from the UE 108 to the data content server 104 or using another mechanism. The Network node(s) 114 along the routing path may comprise routers, domain name system servers, domain host configuration protocol servers, or other network nodes.

When both the requesting UE 108 and the routing path from the UE 108 to the data content server 104 are determined to be trusted by the data content server 104, the data content server 104 may transmit the located desired data content to the requesting UE 108. The data content server 104 may communicate with the signature server 102 regarding status of the request message and/or transmission of the corresponding data content. For example, when both the requesting UE 108 and the routing path from the UE 108 to the data content server 104 are determined to be trusted by the data content server 104 and the data content server 104 has transmitted the located desired data content to the requesting UE 108, the data content server 104 may transmit a message or notification to the signature server 102 indicating that the data content has been transmitted to the requesting UE 108. The message may also comprise information indicating that both the requesting UE 108 and the routing path from the UE 108 to the data content server 104 have been determined to be trusted by the data content server 104.

Alternatively, upon receipt of an inquiry from the signature server 102, the data content server 104 may transmit a message to the signature server 102 indicating whether the data content has been transmitted to the requesting UE 108 and/or whether the requesting UE 108 and the routing path from the UE 108 to the data content server 104 are determined to be trusted. The signature server 102 may periodically transmit inquiries to the data content server 104.

When the requesting UE 108 also requests a key from the data content server 104, the data content server 104 may transmit its key after the determination that the UE 108 is trusted and the routing path from the UE 108 to the data content server 104 is trusted. The key may be transmitted separately from the data content in a variety of ways. For example, the key requiring and/or verification may be performed as a second piece of data content. As another example, an application programming interface (API) may be utilized for key delivery. As a third example, a third party may manage the key delivery, thus the key delivery is separate from the data content delivery. The key may be a public key of the data content server 104. The key may be utilized by the UE 108 to decrypt the digital signature.

The key and the data content may later be combined into a single type length value element by a first trusted router 114 along the routing path from the data content server 104 to the UE 108 after the data content server 104 transmits the data content and the key separately. When the desired data content comprises more than one piece of data content from more than one data content server 104, only one digital signature may be generated and transmitted by the signature server 102 for all the pieces of data content. These pieces of data content may be called a group of data content. The group of data content may be combined upon receipt at the client.

The signature server 102 may comprise a non-transitory memory and a processor. A signature distribution application may be stored in the non-transitory memory of the signature server 102 and may be executed by the processor of the server. The signature distribution application or the signature server 102 may perform a variety of functionality to distribute digital signatures. For example, the signature server 102 may receive a request message, determine whether or not the requesting UE 108 from which the request message is transmitted is trusted, determine whether or not the routing path from the requesting UE 108 to the signature server 102 is trusted, transmit a digital signature based on results of the above determination, communicate with the corresponding data content server 104 on status of transmission of data content and/or signatures, and the like.

For example, the signature server 102 may receive a request message. For example, the signature server 102 may receive a request message transmitted by the UE 108, forwarded by router(s), and/or forwarded by the data content server 104. Alternatively, the trusted signature server 102 may receive a signature request message transmitted by the data content server 104 upon the receipt of a request message at the data content server 104. The trusted signature server 102 may generate a digital signature based on the data content, for example by examining the name of the data content comprised in the request message. The digital signature may also comprise information of the digital signature server 102 and/or the corresponding data content server(s) 104 that store and manage the data content. For example, the digital signature may comprise identification information of the digital signature server 102 and/or the corresponding data content server(s) 104. It should be noted that digital signatures for various data content may be generated by the signature server 102 when the data content is first stored in the data content server 104 and/or prior to the receipt of request messages.

The signature server 102 may then transmit the digital signature based on a determination that the requesting UE 108 is trusted and that the routing path from the requesting UE 108 to the signature server 102 is trusted. The determination may be made in a way similar to how the data content server 104 determines whether the requesting UE 108 is trusted and the routing path from the requesting UE 108 to the data content server 104 is trusted. Thus, the determination process for whether the routing path from the UE 108 to the signature server 102 is trusted may comprise determining whether network node(s) 114 along the routing path are trusted.

When both the requesting UE 108 and the routing path from the UE 108 to the signature server 102 are determined by the signature server 102 to be trusted, the data signature server 102 may transmit the digital signature to the requesting UE 108. The signature server 102 may communicate with the data content server 104 regarding status of the request message and/or transmission of the corresponding digital signature. For example, when both the requesting UE 108 and the routing path from the UE 108 to the signature server 102 are determined by the signature server 102 to be trusted and the signature server 102 has transmitted the corresponding digital signature to the requesting UE 108, the signature server 102 may transmit a message or notification to the data content server 104 indicating that the digital signature has been transmitted to the requesting UE 108. Alternatively, upon receipt of an inquiry from the data content server 104, the signature server 102 may transmit a message to the data content server 104 indicating whether the digital signature has been transmitted to the requesting UE 108 and/or whether the requesting UE 108 and the routing path from the UE 108 to the signature server 102 are determined to be trusted.

In an embodiment, when the desired data content comprises more than one piece of data content from more than one data content server 104, for example when segments of one movie are stored on different data content servers 104, only one digital signature may be generated and transmitted by the signature server 102 for the pieces of data content. The pieces of data content may be combined after receipt at the requesting UE 108.

Figure 2A:
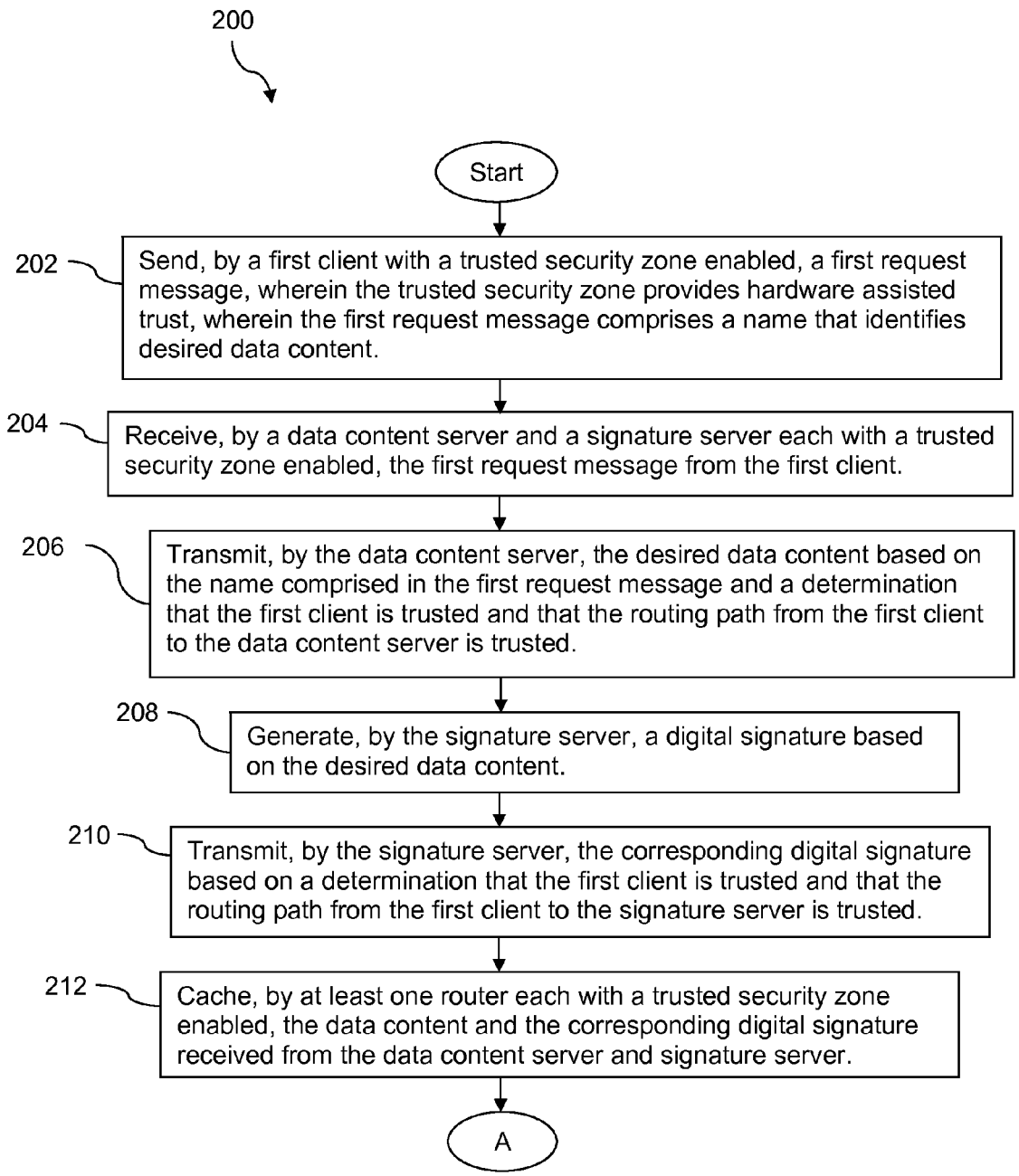
FIG. 2A and FIG. 2B is a flow chart illustrating a method according to an embodiment of the disclosure.
Figure 2B:
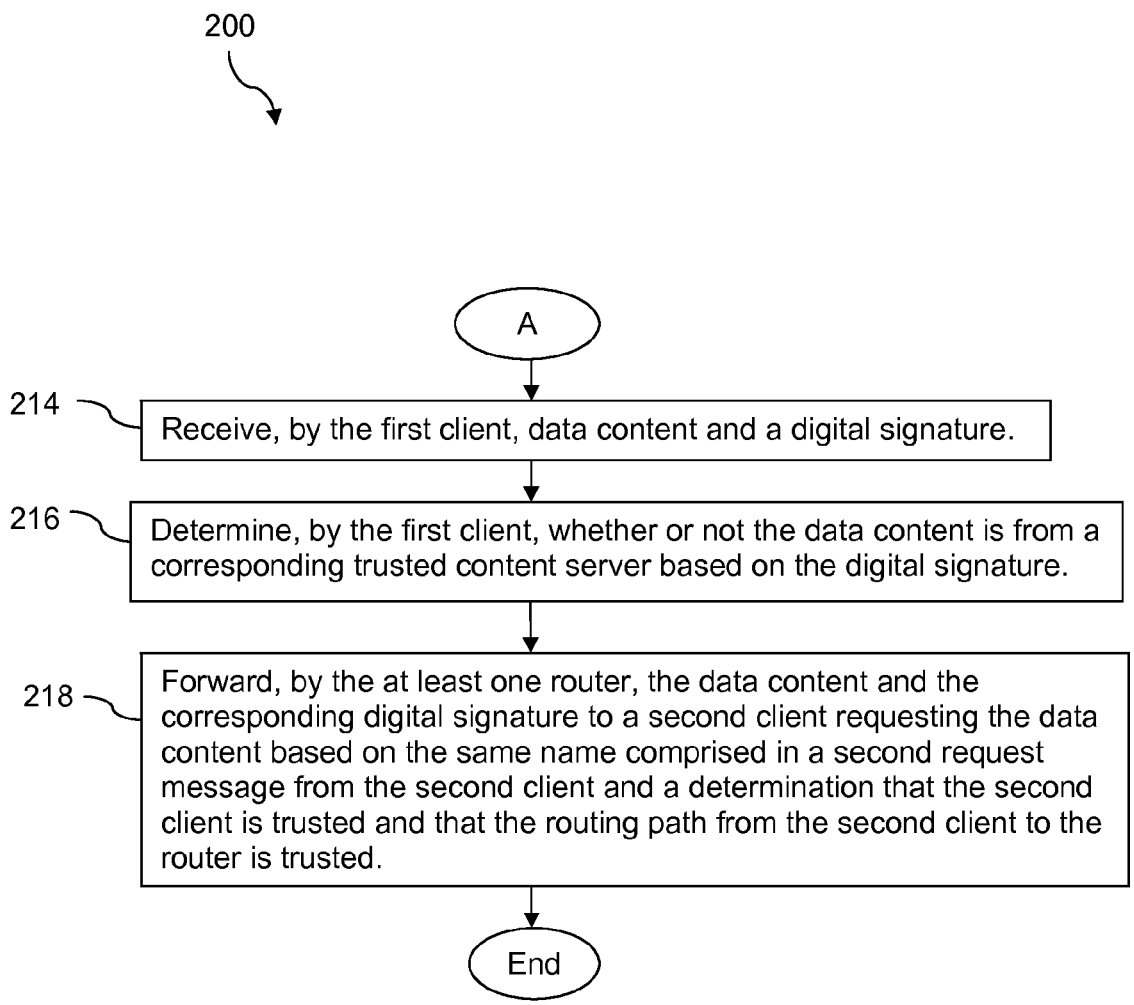

Turning now to FIG. 2A and FIG. 2B, a method 200 is described. At block 202, a first request message is sent by a first client with a trusted security zone enabled, wherein the trusted security zone provides hardware assisted trust, wherein the first request message comprises a name that identifies desired data content. For example, when a user of a first client, a first user equipment 108, requests premium movie content, a first request message may be transmitted by the first user equipment 108. A trusted security zone 112f may be enabled on the first user equipment 108. A trusted application such as a trustlet may be generated on the user equipment 108 to be executed in the trusted security zone 112f to transmit the request message. The first request message may comprise a name of the movie. The name may be unique at least within a domain or subdomain and may follow predefined rules, for example a predefined hierarchy, similar to a uniform resource identifier (URI).

At block 204, the first request message from the first client is received by a data content server 104 and a signature server 102 each with a trusted security zone 112 enabled. At block 206, the desired data content is transmitted by the data content server 104 based on the name comprised in the first request message and a determination that the first client is trusted and that the routing path from the first client to the data content server 104 is trusted. At block 208, a digital signature is generated by the signature server 102 based on the desired data content. At block 210, the corresponding digital signature is transmitted by the signature server 102 based on a determination that the first client is trusted and that the routing path from the first client to the signature server 102 is trusted.

At block 212, the data content and the corresponding digital signature received from the data content server 104 and signature server 102 are cached by at least one router each with a trusted security zone 112 enabled. At block 214, data content and a digital signature are received by the first client. At block 216, it is determined by the first client whether or not the data content is from a corresponding trusted content server based on the digital signature.

At block 218, the data content and the corresponding digital signature are forwarded by the at least one router to a second client requesting the data content based on the same name comprised in a second request message from the second client and a determination that the second client is trusted and that the routing path from the second client to the router is trusted. The router may determine whether or not the routing path from the second client to the router is trusted by examining trust tokens that are built and provided by previous network node(s) 114 along the routing path from the second client to the router or using some other mechanism. The network node(s) 114 along the routing path may comprise routers, domain name system servers, domain host configuration protocol servers, or other network nodes.

Figure 3:
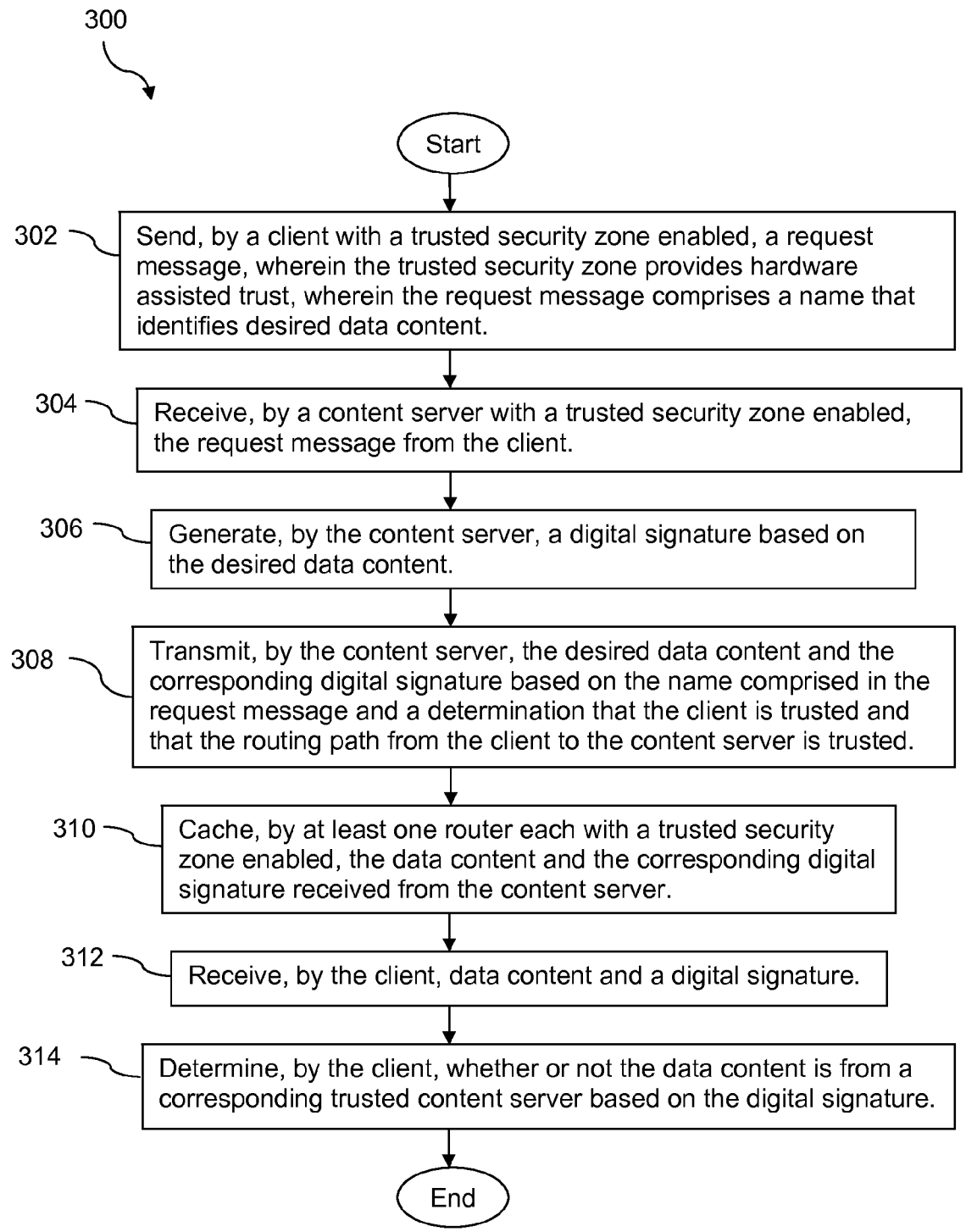
FIG. 3 is a flow chart illustrating another method according to an embodiment of the disclosure.

Turning now to FIG. 3, a method 300 is described. At block 302, a request message is sent by a client with a trusted security zone 112f enabled wherein the trusted security zone 112f provides hardware assisted trust, wherein the request message comprises a name that identifies desired data content. At block 304, the request message from the client is received by a content server 104 with a trusted security zone 112b enabled. At block 306, a digital signature is generated by the data content server 104 based on the desired data content.

At block 308, the desired data content and the corresponding digital signature are transmitted by the content server 104 based on the name comprised in the request message and a determination that the client is trusted and that the routing path from the client to the content server 104 is trusted. At block 310, the data content and the corresponding digital signature received from the data content server 104 are cached by at least one router each with a trusted security zone 112 enabled. At block 312, data content and a digital signature are received by the client. At block 314, it is determined by the client whether or not the data content is from a corresponding trusted content server 104 based on the digital signature.

Figure 4:
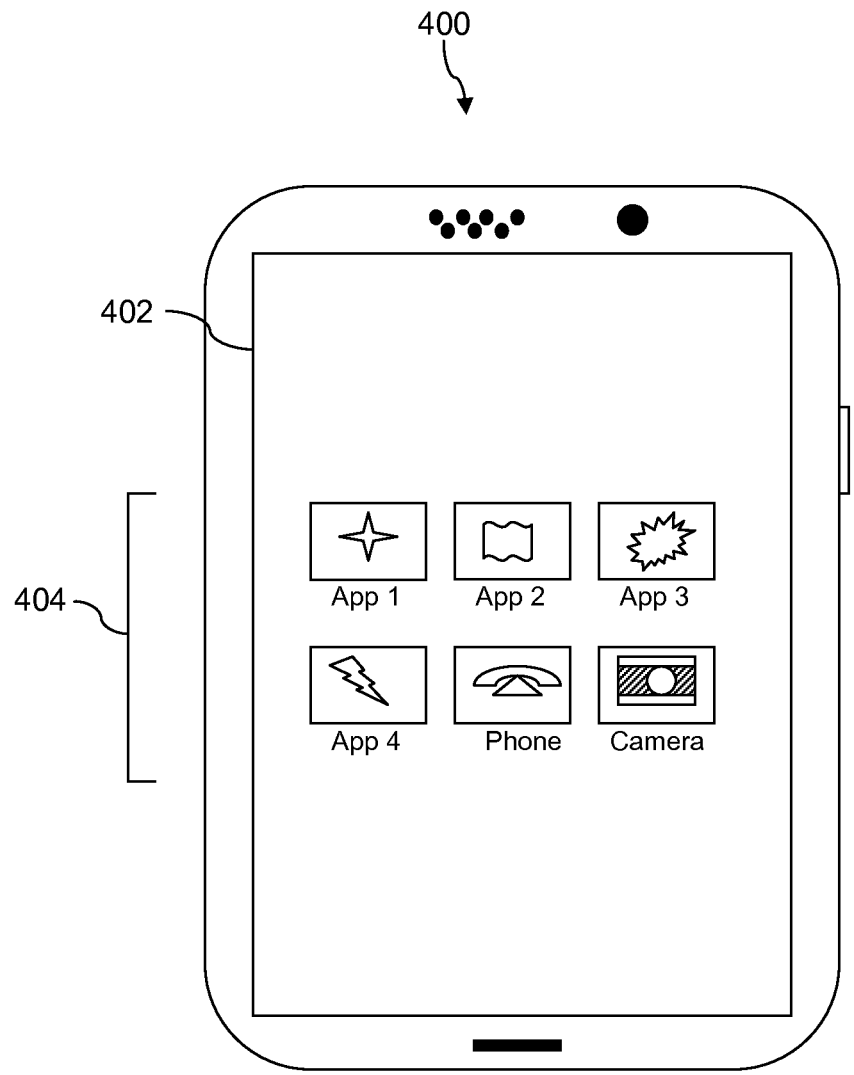
FIG. 4 is an illustration of a mobile communication device according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/ or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
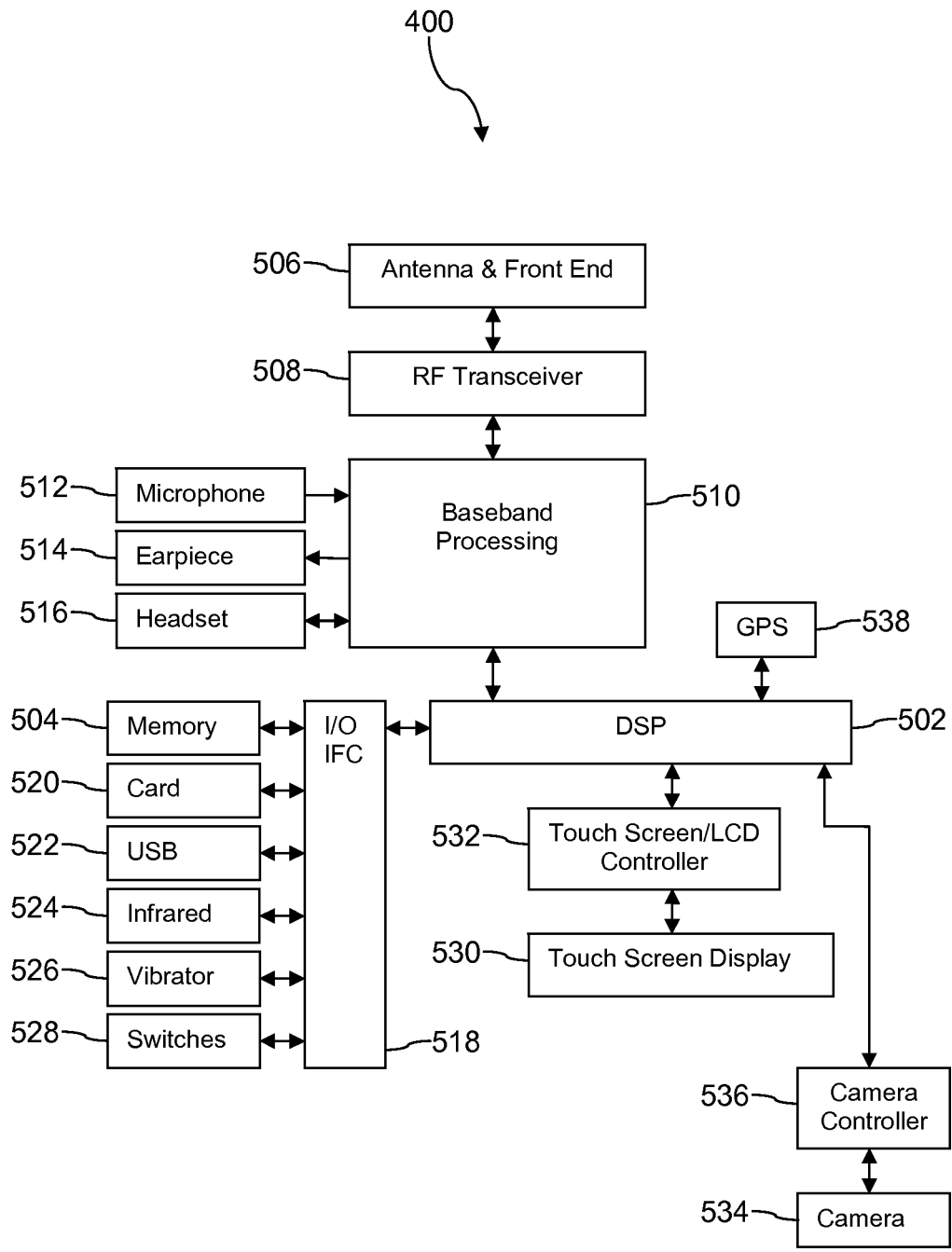
FIG. 5 is a block diagram of a mobile communication device according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
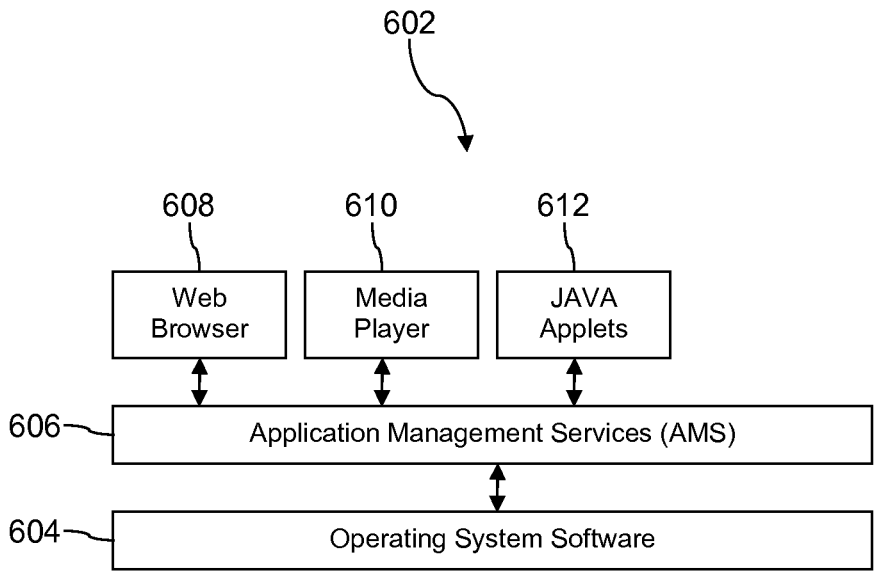
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
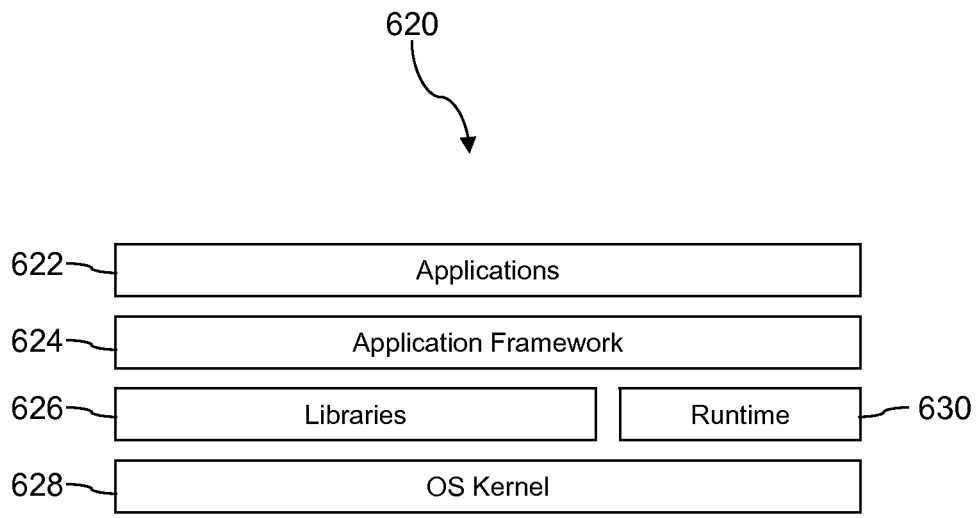
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
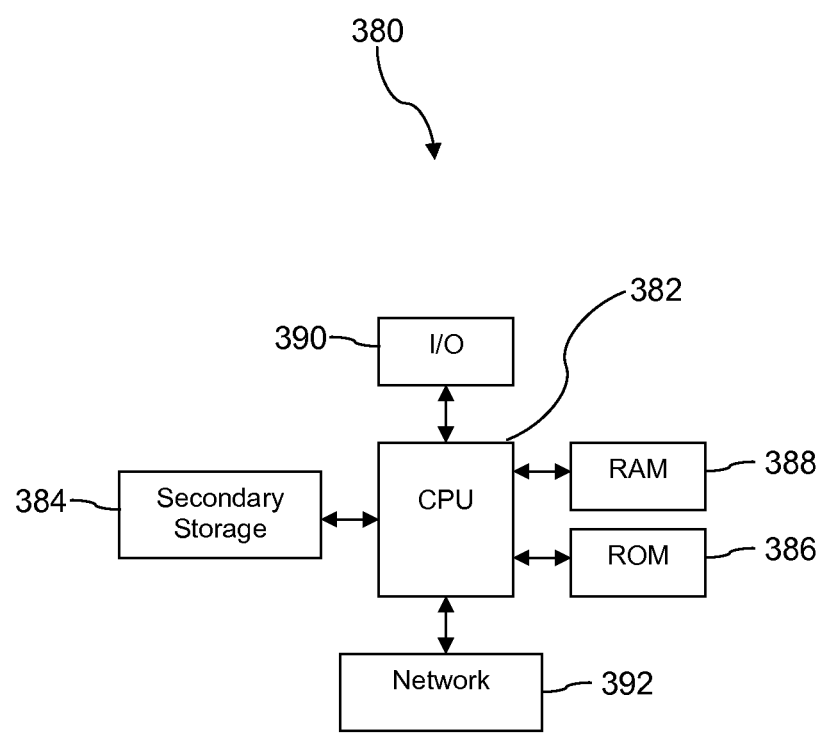
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system delivering data content with hardware assisted provenance proof in named data networking (NDN), comprising:
    a first client with a first client trusted security zone enabled, configured to:
        send a first request message, wherein the first request message comprises a name that identifies desired data content,
        receive data content and a digital signature, and
        determine whether or not the data content is from a corresponding trusted content server based on the digital signature;
    a data content server with a data content server trusted security zone enabled, configured to:
        receive the first request message from the first client, and
        transmit the desired data content based on the name comprised in the first request message and a determination by the data content server independently that the first client is trusted and that the routing path from the first client to the data content server is trusted;
    a signature server with a signature server trusted security zone enabled, configured to:
        receive the first request message from the first client,
        generate the digital signature based on the desired data content, and
        transmit the digital signature based on a determination by the signature server independently that the first client is trusted and that the routing path from the first client to the signature server is trusted; and
    at least one router each with a router trusted security zone enabled, wherein the router trusted security zone, the first client trusted security zone, the data content server trusted security zone, and the signature server trusted security zone provide hardware assisted trust, where
the at least one router is configured to:
cache the data content and the digital signature received from the data content server and the signature server, and
forward the data content and the digital signature to a second client requesting the data content based on the same name comprised in a second request message from the second client and a determination by the at least one router independently that the second client is trusted and that the routing path from the second client to the router is trusted.

2. The system of claim 1, wherein a public key is transmitted by the data content server upon receipt of a request from the client after a determination that the client is trusted, wherein the public key is utilized by the client to decrypt the digital signature.

3. The system of claim 2, wherein the public key and the data content are combined into a single type length value (TLV) element by a first router after the data content server transmits the data content.

4. The system of claim 1, wherein the determination that the routing path from the first client to the data content server is trusted comprises determining whether or not domain name system (DNS) servers and domain host configuration protocol (DHCP) servers along the routing path have hardware assisted trust enabled.

5. The system of claim 1, wherein when the desired data content comprises more than one piece of data content from more than one data content server, only one digital signature is generated and transmitted for the pieces of data content.

6. The system of claim 5, wherein the pieces of data content are combined at the first and second clients.

7. The system of claim 1, wherein a trustlet is generated at the first client to send the first request message in case of commerce use scenarios to provide a higher level of security, where the trustlet executes in the first client trusted security zone and is associated with a communication application.

8. A method of delivering data content with hardware assisted provenance proof in named data networking (NDN), comprising:
sending, by a first client with a first client trusted security zone enabled, a first request message, wherein the first request message comprises a name that identifies desired data content;
receiving, by a data content server with a data content server trusted security zone enabled and a signature server with a signature server trusted security zone enabled, the first request message from the first client;
transmitting, by the data content server, the desired data content based on the name comprised in the first request message and a determination by the data content server independently that the first client is trusted and that the routing path from the first client to the data content server is trusted;
generating, by the signature server, a digital signature based on the desired data content;
transmitting, by the signature server, the digital signature based on a determination by the signature server independently that the first client is trusted and that the routing path from the first client to the signature server is trusted;
caching, by at least one router each with a router trusted security zone enabled, the data content and the digital signature received from the data content server and the signature server, wherein the router trusted security zone, the first client trusted security zone, the data content server trusted security zone, and the signature server trusted security zone provide hardware assisted trust;
receiving, by the first client, the data content and the digital signature;
determining, by the first client, whether or not the data content is from a corresponding trusted content server based on the digital signature; and
forwarding, by the at least one router, the data content and the digital signature to a second client requesting the data content based on the same name comprised in a second request message from the second client and a determination by the at least one router independently that the second client is trusted and that the routing path from the second client to the router is trusted.

9. The method of claim 8, wherein the routing table in the at least one router is secure.

10. The method of claim 8, wherein a public key is transmitted by the data content server upon receipt of a request from the client after a determination that the client is trusted, wherein the public key is utilized by the client to decrypt the digital signature.

11. The method of claim 10, wherein the public key and the data content are combined into a single type length value (TLV) element by a first router after the data content server transmits the data content.

12. The method of claim 8, wherein the determination that the routing path from the first client to the data content server is trusted comprises determining whether or not domain name system (DNS) servers and domain host configuration protocol (DHCP) servers along the routing path have hardware assisted trust enabled.

13. The method of claim 8, wherein when the desired data content comprises more than one piece of data content from more than one data content server, only one digital signature is generated and transmitted for the pieces of data content and the pieces of data content are combined at the first and second clients.

14. The method of claim 8, wherein a trustlet is generated at the first client to send the first request message in case of commerce use scenarios to provide a higher level of security, where the trustlet executes in the first client trusted security zone and is associated with a communication application.

15. A method of delivering data content with hardware assisted provenance proof in named data networking (NDN), comprising:
sending, by a client with a client trusted security zone enabled, a request message, wherein the request message comprises a name that identifies desired data content;
receiving, by a data content server with a data content server trusted security zone enabled and a signature server with a signature server trusted security zone enabled, the request message from the client;
transmitting, by the data content server, the desired data content based on the name comprised in the request message and a determination by the data content server independently that the first client is trusted and that the routing path from the client to the data content server is trusted;
generating, by the signature server, a digital signature based on the desired data content;
transmitting, by the signature server, the digital signature based on a determination by the signature server independently that the client is trusted and that the routing path from the client to the signature server is trusted;

caching, by at least one router each with a router trusted security zone enabled, the data content and the digital signature received from the content server, wherein the router trusted security zone, the client trusted security zone, the data content server trusted security zone, and the signature server trusted security zone provide hardware assisted trust;

receiving, by the client, the data content and the digital signature; and determining, by the client, whether or not the data content is from a corresponding trusted content server based on the digital signature.

16. The method of claim 15, wherein the at least one router caches the data content and the digital signature received from the data content server and the signature server.

17. The method of claim 16, wherein the at least one router forwards the data content and the digital signature to a second client requesting the data content based on the same name comprised in a second request message from the second client and a determination that the second client is trusted and that the routing path from the second client to the router is trusted.

18. The method of claim 15, wherein a public key is transmitted by the data content server upon receipt of a request from the client after a determination that the client is trusted, wherein the public key is utilized by the client to decrypt the digital signature.

19. The method of claim 15, wherein the public key and the data content are combined into a single type length value (TLV) element by a first router after the data content server transmits the data content.

20. The method of claim 15, wherein a trustlet is generated at the client to send the request message for commerce purposes to provide a higher level of security where the trustlet executes in the client trusted security zone and is associated with a communication application.

* * * * *